(12) United States Patent
Nishimura

(10) Patent No.: US 6,615,230 B2
(45) Date of Patent: *Sep. 2, 2003

(54) DATA ACCESS RIGHT MANAGEMENT APPARATUS IN A DATA-INDEPENDENT COMPUTER SYSTEM

(75) Inventor: Takeshi Nishimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/093,937

(22) Filed: Jun. 9, 1998

(65) Prior Publication Data

US 2003/0046347 A1 Mar. 6, 2003

Related U.S. Application Data

(63) Continuation of application No. 08/559,428, filed on Nov. 15, 1995, now Pat. No. 5,842,043.

(30) Foreign Application Priority Data

Nov. 15, 1994 (JP) .............................................. 6-280660

(51) Int. Cl.[7] .............................................. G06F 13/14
(52) U.S. Cl. ...................................... 709/101; 713/200
(58) Field of Search ....................... 707/4, 10; 709/101, 709/313–318, 229; 710/200–244

(56) References Cited

U.S. PATENT DOCUMENTS

| | | | | |
|---|---|---|---|---|
| 3,956,615 A | * | 5/1976 | Anderson et al. .............. 705/72 |
| 4,317,957 A | * | 3/1982 | Sendrow ........................ 705/1 |
| 4,386,266 A | * | 5/1983 | Chesarek ...................... 705/72 |
| 5,249,290 A | | 9/1993 | Heizer ......................... 709/105 |
| 5,305,195 A | | 4/1994 | Murphy ......................... 705/1 |
| 5,319,544 A | | 6/1994 | Schmerer et al. ............. 705/28 |
| 5,333,266 A | | 7/1994 | Boaz et al. .................. 709/206 |
| 5,384,835 A | | 1/1995 | Wheeler et al. ......... 379/93.25 |
| 5,428,782 A | | 6/1995 | White ......................... 709/101 |
| 5,621,734 A | | 4/1997 | Mann et al. ................. 709/227 |
| 5,745,748 A | * | 4/1998 | Ahmad et al. ................ 707/10 |
| 5,845,069 A | * | 12/1998 | Tanaka ........................ 713/200 |
| 6,012,143 A | * | 1/2000 | Tanaka ........................ 713/200 |
| 6,088,717 A | * | 7/2000 | Reed et al. ................. 709/201 |

* cited by examiner

*Primary Examiner*—St. John Courtenay, III
(74) *Attorney, Agent, or Firm*—Staas & Halsey LLP

(57) ABSTRACT

The computer system has a processing machine for receiving an electronic message including a request of a transaction from a network, transmitting an electronic message including results of the transaction to the network, and executing the transaction processes corresponding to transmitted/received electronic messages. The computer system also has a data machine for receiving the electronic message including the request of the data accesses from the network, transmitting the electronic message including the results of the data accesses to the network. The computer system also has a man-machine interface machine for transmitting the electronic message including the results of the transaction to the network, receiving the electronic message including the results of the transaction form the network. This computer system includes a network manager for managing access rights of respective users for accessing the processing machine and the data machine connected to the network.

7 Claims, 18 Drawing Sheets

( S : SUPER USER , R W : READABLE/WRITABLE , R : REFERENCEABLE ONLY)

1501

| ID TABLE | PROCESSING MACHINE ID | PROCESSING MACHINE ID | PROCESSING MACHINE ID | .. |
|---|---|---|---|---|
| | TRANSACTION 1 | TRANSACTION 2 | TRANSACTION 3 | |
| USER ID 1 | S | S | S | |
| USER ID 2 | R | R W | R | |
| USER ID 3 | | R W | | |
| .. | | | | |

1502

| FILE ACCESS RIGHT TABLE | DATA MACHINE ID | DATA MACHINE ID | DATA MACHINE ID | .. |
|---|---|---|---|---|
| | FILE ID | FILE ID | FILE ID | |
| | DATA ITEM 1 | DATA ITEM 2 | DATA ITEM 3 | |
| USER ID 1 | S | S | S | |
| USER ID 2 | R | R W | R | |
| USER ID 3 | | R W | | |
| .. | | | | |

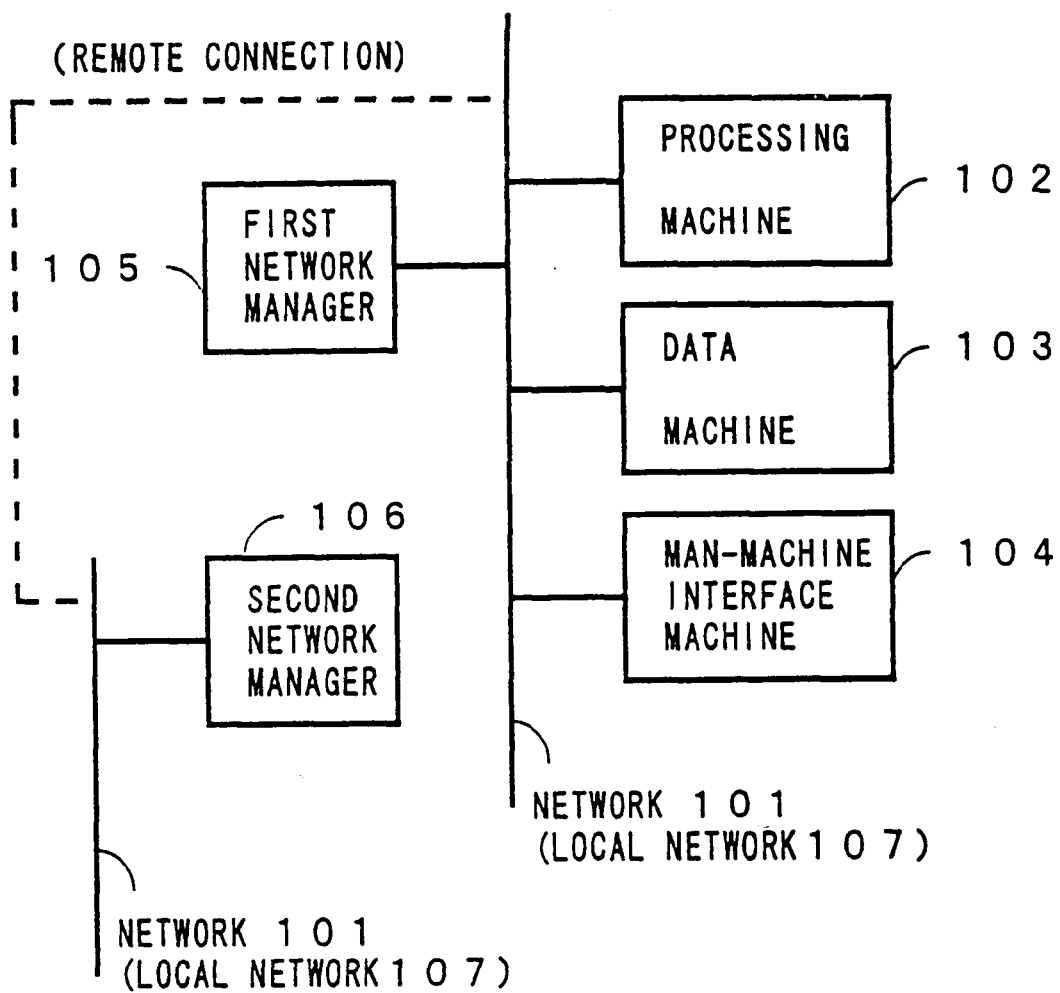
F I G. 1

FIG. 6A

| ELECTRONIC MESSAGE CONTROLLER | PROCESS ID | SCREEN ID | SCREEN CONTROL INFORMATION | DATA AREA INFORMATION | DATA AREA 1 | DATA AREA 2 |
|---|---|---|---|---|---|---|
| 601 | 602 | 603 | 604 | 605 | 606 | 606 |

FIG. 6B

| ELECTRONIC MESSAGE CONTROLLER | PROCESS ID | FILE ID | SEARCH CONTROL INFORMATION | DATA AREA INFORMATION | DATA AREA 1 | DATA AREA 2 |
|---|---|---|---|---|---|---|
| 601 | 602 | 607 | 608 | 605 | 606 | 606 |

FIG. 6C

| ELECTRONIC MESSAGE IDENTIFICATION CODE | SOURCE ID | DESTINATION ID | USER ID | ELECTRONIC MESSAGE IDENTIFICATION SERIAL No. | TRANSMISSION TIME |
|---|---|---|---|---|---|
| 609 | 610 | 611 | 612 | 613 | 614 |

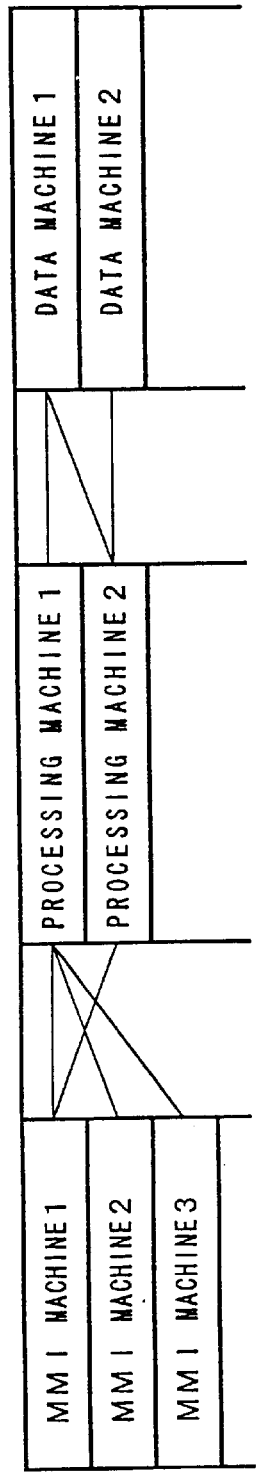

FIG. 10A

| LOCAL ID | REMOTE LINK INFORMATION | ATTRIBUTE 1 | ATTRIBUTE 2 |
|---|---|---|---|
| | | - | - |

| LOCAL ID | | LINK INFORMATION | ATTRIBUTE 1 | ATTRIBUTE 2 |
|---|---|---|---|---|
| | MMI MACHINE 1 | LINK INFORMATION | ATTRIBUTE 1 | ATTRIBUTE 2 |
| | MMI MACHINE 2 | LINK INFORMATION | ATTRIBUTE 1 | ATTRIBUTE 2 |
| - | - | - | - | - |
| | PROCESSING MACHINE 1 | LINK INFORMATION | ATTRIBUTE 1 | ATTRIBUTE 2 |

| LOCAL ID | |
|---|---|
| MMI 1 | MMI 2 |

1005 / 1003

| LOCAL ID | |
|---|---|
| PROCESSING MACHINE 1 | PROCESSING MACHINE 2 |

| LOCAL ID | |
|---|---|
| DATA MACHINE | DATA MACHINE |

( ---▶ : SUPER CLASS DEFINITION    ──── : CONNECTION    ──── : NON-CONNECTION )

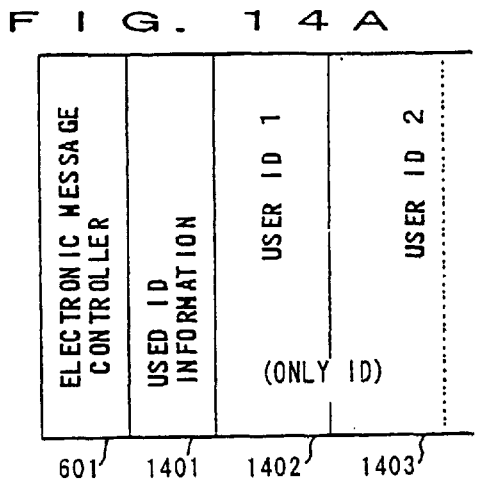
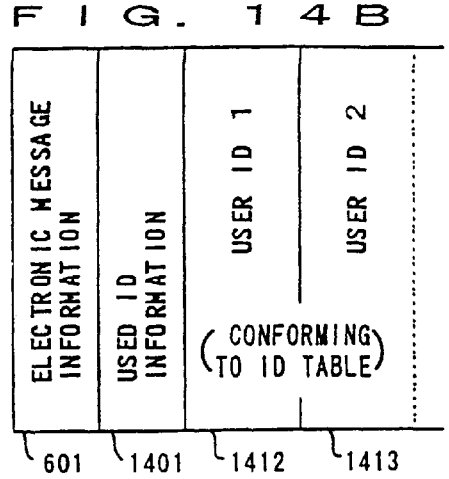
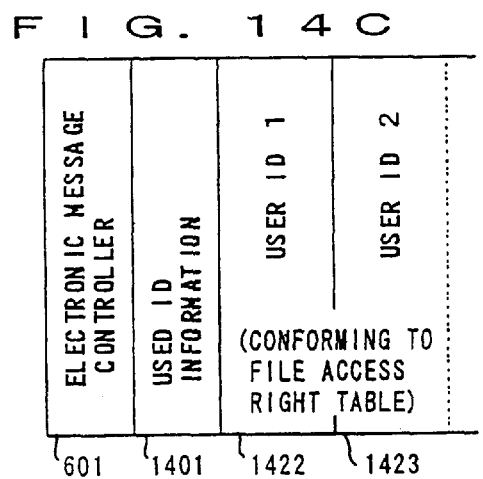
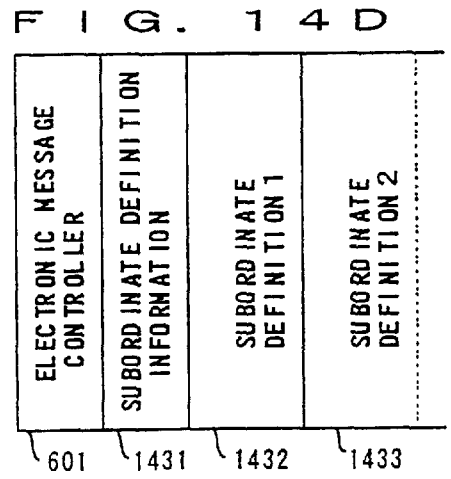
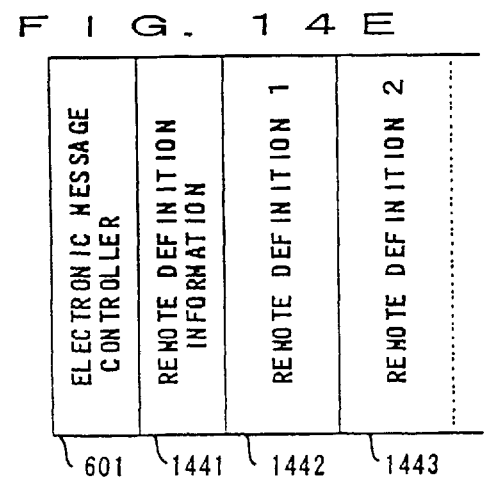

(S : SUPER USER , RW : READABLE/WRITABLE , R : REFERENCEABLE ONLY)

| ID TABLE | PROCESSING MACHINE ID | PROCESSING MACHINE ID | PROCESSING MACHINE ID | |
|---|---|---|---|---|
| | TRANSACTION 1 | TRANSACTION 2 | TRANSACTION 3 | .. |
| USER ID 1 | S | S | S | |
| USER ID 2 | R | RW | R | |
| USER ID 3 | | RW | | |
| .. | | | | |

1501

| FILE ACCESS RIGHT TABLE | DATA MACHINE ID | DATA MACHINE ID | DATA MACHINE ID | |
|---|---|---|---|---|
| | FILE ID | FILE ID | FILE ID | .. |
| | DATA ITEM 1 | DATA ITEM 2 | DATA ITEM 3 | |
| USER ID 1 | S | S | S | |
| USER ID 2 | R | RW | R | |
| USER ID 3 | | RW | | |
| .. | | | | |

(S : SUPER USER, RW : READABLE/WRITABLE, R : REFERENCEABLE ONLY)

| ID TABLE | LOCAL ID<br>PROCESSING MACHINE ID<br>TRANSACTION 1 | LOCAL ID<br>PROCESSING MACHINE ID<br>TRANSACTION 2 | LOCAL ID<br>PROCESSING MACHINE ID<br>TRANSACTION 3 | .. |
|---|---|---|---|---|
| USER ID 1 | S | S | S | |
| USER ID 2 | R | RW | R | |
| USER ID 3 |   | RW |   | |
| .. | | | | |

1601

| FILE ACCESS RIGHT TABLE | LOCAL ID<br>DATA MACHINE ID<br>FILE ID<br>DATA ITEM 1 | LOCAL ID<br>DATA MACHINE ID<br>FILE ID<br>DATA ITEM 2 | LOCAL ID<br>DATA MACHINE ID<br>FILE ID<br>DATA ITEM 3 | .. |
|---|---|---|---|---|
| USER ID 1 | S | S | S | |
| USER ID 2 | R | RW | R | |
| USER ID 3 |   | RW |   | |
| .. | | | | |

1701 — ID TABLE

| ID TABLE | TRANSACTION 1 / PROCESSING MACHINE ID | TRANSACTION 2 / PROCESSING MACHINE ID | TRANSACTION S1 | .. |
|---|---|---|---|---|
| USER ID 1 | | | S | |
| USER ID 2 | | RW | R | |
| USER S 1 | | RW | R | |
| .. | | | | |

1702 — FILE ACCESS RIGHT TABLE

| FILE ACCESS RIGHT TABLE | DATA ITEM 1 / DATA MACHINE ID | DATA ITEM 2 / DATA MACHINE ID | DATA ITEM S1 | .. |
|---|---|---|---|---|
| USER ID 1 | | | S | |
| USER ID 2 | | RW | R | |
| USER S 1 | | RW | R | |
| .. | | | | |

FIG. 17B

1703 — ID TABLE

| ID TABLE | ID / TRANSACTION 1 / PROCESSING MACHINE ID | ID / TRANSACTION 2 / PROCESSING MACHINE ID | ID / TRANSACTION S1 | .. |
|---|---|---|---|---|
| USER ID 1 | | | S | |
| USER ID 2 | | RW | R | |
| USER S 1 | | RW | R | |
| .. | | | | |

1704 — FILE ACCESS RIGHT TABLE

| FILE ACCESS RIGHT TABLE | LOCAL ID / DATA ITEM 1 / DATA MACHINE ID | LOCAL ID / DATA ITEM 2 / DATA MACHINE ID | TRANSACTION S1 | .. |
|---|---|---|---|---|
| USER ID 1 | | | S | |
| USER ID 2 | | RW | R | |
| USER S 1 | | RW | R | |
| .. | | | | |

DATA ACCESS RIGHT MANAGEMENT APPARATUS IN A DATA-INDEPENDENT COMPUTER SYSTEM

This application is a continuation of application Ser. No. 08/559,428 filed Nov. 15, 1995, now U.S. Pat. No. 5,842,043. This invention relates to an apparatus for managing data access rights in a data-independent computer system.

BACKGROUND OF THE INVENTION

1. Field of the Invention

This invention relates to an apparatus for managing data access right in a data-independent computer system.

2. Description of the Related Art

In conventional computer systems, general-purpose operating systems (hereinafter abbreviated to OSs) are executed on general-purpose hardware, and support as many software applications as possible, in order to efficiently use expensive hardware resources.

Since this general use results in redundancy, the size of the OSs and their overheads increase as computer technology develops. It has become more common that one general-purpose machine executes a number of software applications in parallel. As a result, the configuration of such a machine has become expanded and complicated, and consequently the performance and reliability of the entire computer system have deteriorated. Nowadays, though the Cost performance of computer hardware has significantly been improved, the disadvantages of the general use of computer systems have been greater than the advantages thereof.

In addition, the configuration and execution status of conventional computer systems are different from the organization and methods for processing jobs in companies. Accordingly, for example, experts in certain business fields cannot easily computerize their business transactions in those fields. This is firstly because methods for configuring conventional computer systems are not intended for end users. Secondly, developers of the computer systems, who do not fully understand such business transactions, configure the computer systems instead of the experts, who are familiar with their business fields, but who are unfamiliar with computer systems.

Particularly, in recent years, the networking of computer systems has been developed to flexibly cope with the various business transactions performed in companies, etc. To connect a new computer to a network, it is required for an expert who has special knowledge of computer systems to set complex parameters. A person who is familiar with handling the business transactions, but not so familiar with computer systems, cannot easily build the network. Currently, the company is forced to depend on the computer developers.

SUMMARY OF THE INVENTION

An object of this invention is to implement a computer system, which has a simple configuration with high reliability and performance, for easily building a network that corresponding to human business transactions and procedures.

Another object of this invention is to provide a computer system for improving security by managing user access rights for accessing a processing machine and a data machine in a network that connects the processing machine, the data machine, and a man-machine interface machine.

A feature of the present invention resides in a data access right management apparatus in a data-independent computer system comprising, at least one of a processing machine for receiving an electronic message including a request of a transaction process from a network, transmitting an electronic message including results of the transaction process to the network, transmitting an electronic message including a request of data accesses to the network, receiving an electronic message including results of the data accesses from the network, and executing transaction processes corresponding to transmitted/received electronic messages; a data machine for receiving the electronic message including the request of the data accesses, transmitting the electronic message including the results of the data accesses to the network, and accessing stored data corresponding to the transmitted/received electronic messages; and a man-machine interface machine for transmitting the electronic message including the request of the transaction process, receiving the electronic message including the results of the process from the network, and performing man-machine interface processes corresponding to the transmitted/received electronic messages; and a first network manager for managing access rights of respective users for accessing the processing machine and the data machine through the network, where the processing machine, the data machine or the man-machine interface machine are connected to the network.

BRIEF DESCRIPTION OF THE DRAWINGS

FIG. 1 is a block diagram of the present invention;

FIGS. 6A, 6B and 6C are schematic diagrams showing formats of electronic messages (No. 1);

FIGS. 9A and 9B show structures of a connection management table managed by a local network manager;

FIGS. 10A, 10B and 10C show structures of a connection management table managed by an enterprise network manager;

FIGS. 14A to 14E are schematic diagrams showing formats of electronic messages in the third embodiment according to the present invention;

FIG. 15 is a schematic diagram showing structures of an ID table and a file access right table that are managed by the local network manager;

FIG. 16 is a schematic diagram showing structures of an ID table and a file access right table managed by the enterprise network manager;

FIGS. 17A and 17B are schematic diagram showing structures of an ID table and a file access right table using the superclasses.

DETAILED DESCRIPTION OF EMBODIMENTS

Figure 2:
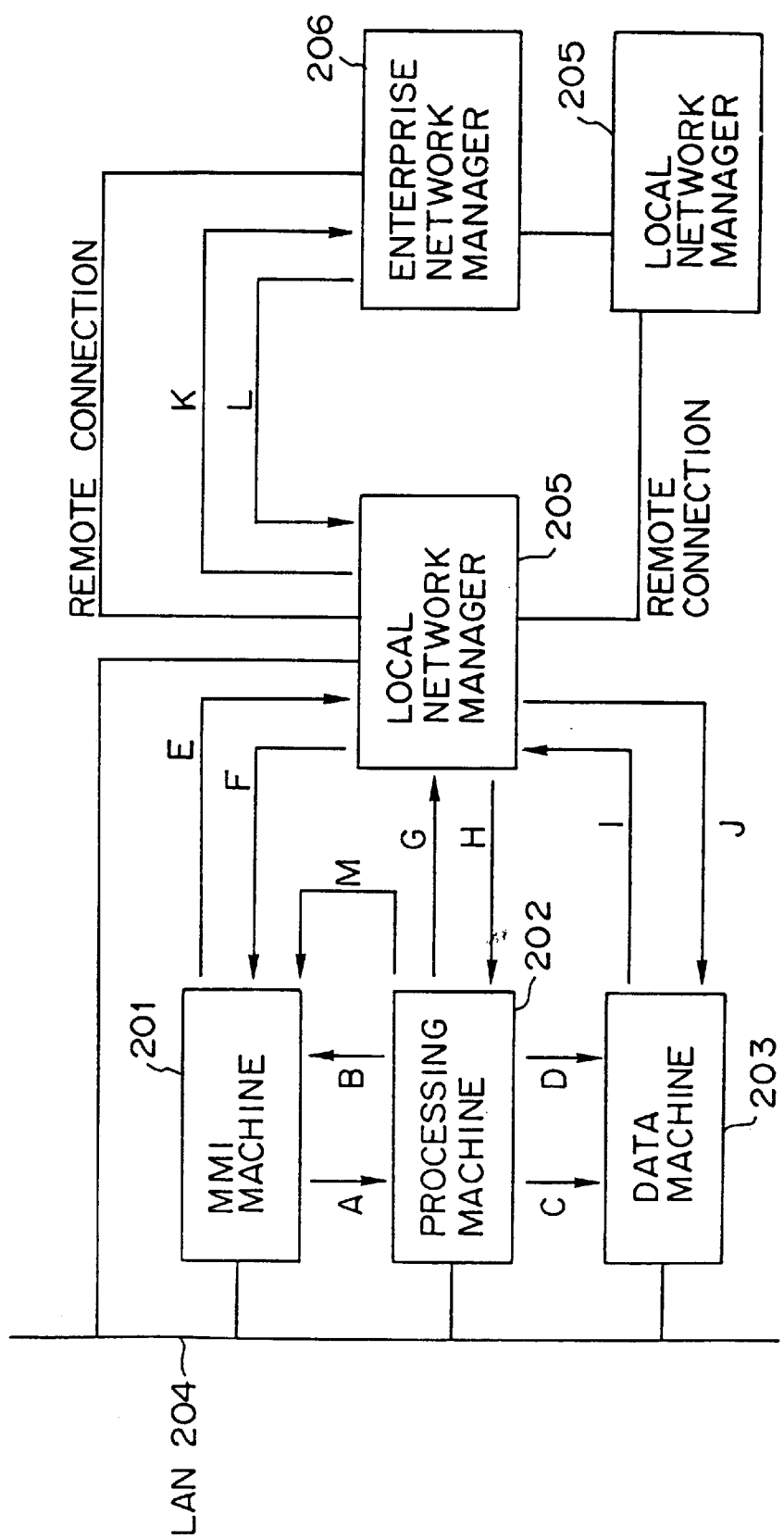
FIG. 2 is a block diagram of an embodiment implemented by the present invention.

FIG. 1 shows a block diagram of a principle of the present invention.

This invention assumes a data-independent computer system having a configuration where at least one of a processing machine 102, a data machine 103, and a man-machine interface machine 104, to be described below, is connected to a network 101.

The processing machine 102 receives an electronic message including a request of a transaction, transmits an electronic message including results of the transaction to the network 101, transmits an electronic message including a request of data accesses to the network 101, receives an electronic message including results of the data accesses from the network 101, and performs the transactions corresponding to the transmitted and received messages.

The data machine 103 receives the electronic message including the request of the data accesses from the network 101, transmits the electronic message including the results of the data accesses, and accesses stored data corresponding to the transmitted and received messages.

The man-machine interface machine 104 transmits the electronic message including the request of the transaction to the network 101, receives the electronic message including the results of the transaction from the network 101, and performs man-machine interface processes corresponding to the transmitted and received electronic messages.

Based on the above described assumption, this invention implements a first network manager 105 that manages an ID table for specifying whether or not a user can access the processing machine 102 via the man-machine interface machine 104, and a file access right table for specifying whether or not the user can access the data machine 103, when the processing machine 102, the data machine 103, or the man-machine interface machine 104 are connected to the network 101.

The first network manager 105 obtains access rights for accessing the processing machine 102 and the data machine 103 of a new user, accepts changes of the access rights of respective users, made to the processing machine 102 and the data machine 103 on the network 101, and transmits an electronic message including information on the changes of the access rights, to any of the machines where the changes occur, such as the processing machine 102, the data machine 103, and the man-machine interface machine 104, at the time those changes are made to the access rights. Any of the processing machine 102, the data machine 103, and the man-machine interface machine 104 which receives this message, will change own access right according to the information on the changes of the access rights included in the received message.

In the above described configuration according to the present invention, if the network 101 consists of a plurality of local networks 107, the first network manager 105 is connected to the plurality of local networks 107, and manages the access rights of respective users for accessing the processing machine 102 and the data machine 103 on the local network, when the processing machine 102, the data machine 103, or the man-machine interface machine 104 are connected to the local network 107, the processing machine 102, the data machine 103, or the man-machine interface machine 104.

The configuration according to this invention further implements a second network manager 106, which is connected to one of the local networks 107, and manages the access rights of respective users for accessing the processing machine 102, the data machine 103, and the man-machine interface machine 104 between the plurality of local networks 107. The second network manager 106 changes its own management status by receiving an electronic message including the information on the changes of the management status of the access rights, from the first network manager 105 where the changes occur, at the time the changes are made to the management status of the access rights in the first network manager 105. Furthermore, the second network manager 106 accepts the changes of the access rights made to each user processing machine 102 and data machine 103 between the plurality of local networks 107, and transmits the electronic message including the information on the changes of the access rights, to the first network manager 105 where the changes occur, at the time the changes are made to the access rights. When receiving the electronic message, the first network manager 105 changes its own management status according to the information on the changes of the access rights included in that message.

The present invention implements a configuration where the capabilities of a computer system are divided into three—a man-machine interface capability, a processing capability, and a data storage capability, which are respectively implemented in dedicated machines such as a man-machine interface machine 104, a processing machine 102, and a data machine 103, which are connected over a network 101.

By implementing the configuration where the machines dedicated to the respective capabilities are connected over the network, the conventional expanded system configurations are made simple as the first advantage. That is, the capabilities of the processing machine 102 are very much simplified, and hardware and software for performing transactions are integrated and provided as one body, and only software dedicated to each piece of hardware is executed. For memory management, fixed memory areas are allocated and there is no need to control virtual memory space. Accordingly, swap-in/swap-out controls are no longer required for program data. Since task control may be implemented as single task control, also controls such as transaction management, priority management, etc. are no longer required. Thus, in the processing machine 102, almost no capabilities are required for the current operating systems. Since the data machine 103 may be implemented as a machine dedicated to a data search capability, a data update capability, or a data read/write capability, the structure of the data machine can also be simplified. The man-machine interface machine 104 may be implemented as a machine equipped without a data storage capability, and only with a man-machine interface capability. Accordingly, the man-machine interface Machine 104 may easily be provided by a device manner such as a conventional personal computer. Simplifying the computer system in such a way significantly improves the reliability of the entire system, and allows cheaper CPUs to be employed in machines such as the processing machine 102, etc. It greatly contributes to improving the cost performance of a computer system. Since new machines may be added or replaced depending on business requirements, a computer system with high flexibility, efficiency, and expendability, corresponding to the business requirements, may be configured. Furthermore, if a data machine is provided for each database, there will be almost no possibility that one particular transactions may experience a delay caused by another transactions.

The first network manager 105 and the second network manager 106 intensively manage information on the access right of each of the users for accessing machine 102 and the machine 103. Specifically, when a new user joins the network 101, both managers manage the information on the access rights of the new user. Thus, the present invention greatly simplifies computer management by centralizing operation management and fault management of the entire computer system in the first network manager 105, the second network manager 106, the network 101, and the data machine 104.

As the second advantage, connecting machines equipped with dedicated capabilities to a network facilitates the standardizing of communications protocols between the machines. Specifically, communications between the machines are standardized as electronic messages at a transaction level, consisting of information that can easily correspond to a user ID, a transaction ID, a screen ID, a file ID, and an SQL statement, etc. A request of a transaction is made to any of the machines equipped with respective dedicated and independent capabilities, using such electronic messages. As a result, each of the machines can be reused and duplicate development thereof can be reduced.

As the third advantage, the processing machine 102 and the data machine 103 are dedicated to capabilities and data corresponding to transactions, and the communications between the machines are limited to the electronic messages at a transaction level, so that the configurations and execution status of the computer systems may correspond to the organizations of companies, etc. and the methods for processing businesses in the companies. Accordingly, even if an expert in a certain business field does not have full knowledge of computers and networking, he or she can configure the computer systems with ease. Specifically for the access right information managed by the first network manager 105 or the second network manager 106, each of the machines 102, 103, and 104 directly corresponds to each of the transactions. A definition of the access right can be made in a similar manner as in a definition of a relationship between the transactions. Therefore, even if a local manager makes a local network definition for the first network manager 105 or a global manager makes a global network definition (remote definition) for the second network manager 106, a knowledge of computers and networking is not required. Thus, work loads and costs can significantly be reduced when configuring computer systems of both a vendor and a client. Since the hierarchical structure of the access right definitions which comprises the first network manager 105 and the second network manager 106 may correspond to that of the transactions, the access right definitions can be made intuitively.

DESCRIPTIONS OF THE PREFERRED EMBODIMENT

Detailed explanation on an embodiment according to the present invention is provided below, referring to the accompanying drawings.

FIG. 2 is a block diagram showing a system configuration of an embodiment according to the present invention.

In this embodiment, an MMI machine 201, a processing machine 202, and a data machine 203 share and perform a transaction.

The MMI machine 201, the processing machine 202, and the data machine 203 are connected over a local network (LAN) 204. A local network manager 205 and an enterprise network manager 206 manage these connections. Each of the machines or either of the managers communicates with a plurality of machines using electronic messages.

The electronic messages (A and B) are exchanged between the MMI machine 201 and the processing machine 202, and the messages (C and D) are exchanged between the processing machine 202 and the data machine 202. Messages are not exchanged between the MMI machine 201 and the data machine 203.

Each machine exchanges control electronic messages through the local network manager 205. The local network manager 205 also communicates with the enterprise network manager 206. The interface between each machine and each manager is standardized, to be described later. A system program and an application program are stored in each ROM built into each machine or in each manager. The number of the MMI machines 201, the processing machines 202, and the data machines 203, which are connected to the LAN 204, may be any number. One local network manager 205 is always connected to one LAN 204. The LAN 204 may also be connected to another LAN or a public network via a specific gateway machine, which is one of the processing machines 202. In this case, the processing machine 202 connected to the LAN 204 may also access the data machine connected to the other network. The enterprise network manager 206, which is connected to one or more LANS, controls each LAN by exchanging the electronic messages between a plurality of local network managers 205.

Figure 3:
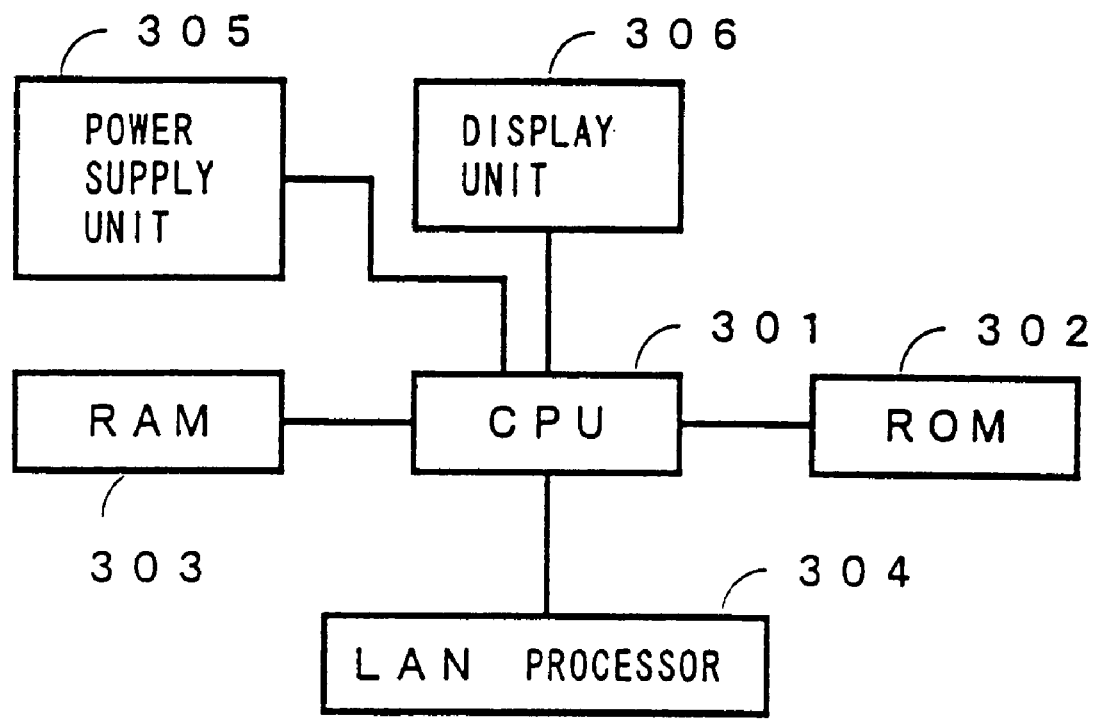
FIG. 3 is a block diagram of structure of an MMI machine.

The capabilities of the MMI machine 201 are dedicated to those of the man-machine interface. As shown in FIG. 3, for example, this machine consists of a CPU 301, a ROM 302, a RAM 303, a LAN processor 304, a power supply unit 305, a display unit 306, etc. The MMI machine 201 includes such devices as an image input/output device, a speech input/output device, a special input device such as a touch screen, etc, a dedicated device such as an ATM, etc. in addition to the display unit 306 shown in FIG. 3. The LAN processor 304 is an interface for connecting to the LAN 204, and is equipped with capabilities equivalent to those of a conventional network interface unit.

Screen information displayed on the display unit 306 included in the MMI machine 201 is downloaded from the processing machine 202 for processing an application program for a business transaction when initially invoked. After that, only input/output items and screen control information including moving picture data and speech data, are exchanged as the electronic messages between the processing machine 202 and the MMI machine 201. The information downloaded from the processing machine 202 is stored in the MMI machine 201. It may be again downloaded after some information is deleted depending on requirements.

The MMI machine 201 may also execute local processes. In such a case, the MMI machine 201 needs to embed the data machine 203 and the processing machine 202, which are dedicated to the processes. That is, the MMI machine is configured as a device equipped with capabilities equivalent to those of a personal computer.

Figure 4:
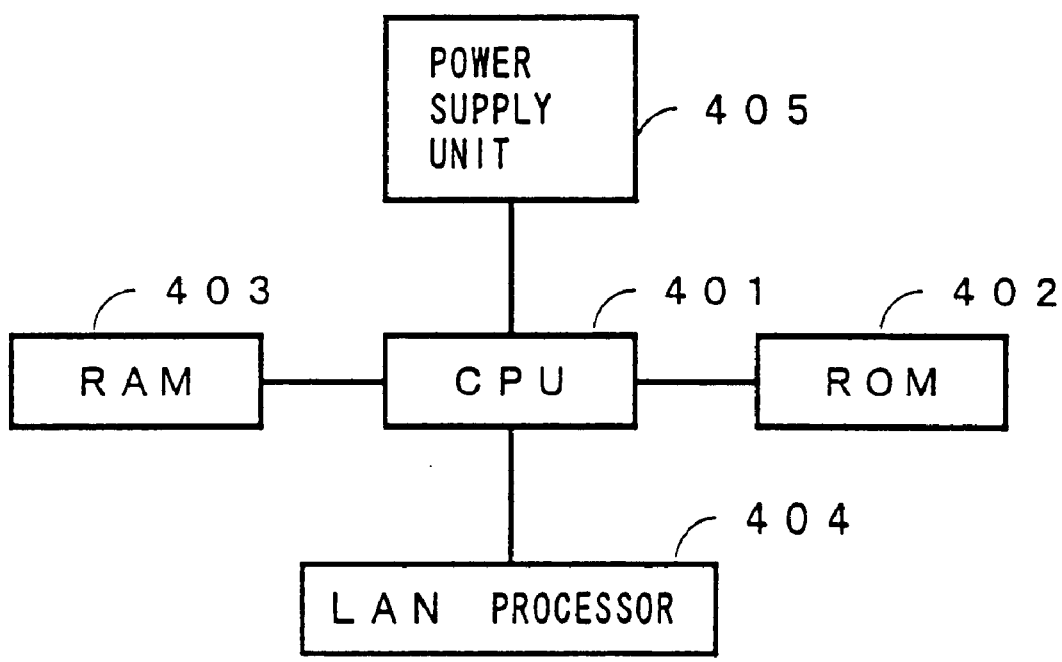
FIG. 4 is a block diagram of structure of a processing machine.

The MMI machine 201 is basically used by each user, but a plurality of users can use one MMI machine 201 in turn. Each of the windows displayed on the display unit 306 in one MMI machine 201 may be assigned to each of the users. The processing machine 202 is configured as, what is called, a one-board computer. As shown in FIG. 4, it consists of a CPU 401, a ROM 402, a RAM 403, a LAN processor 404, a power supply unit 405, etc.

For the processing machine 202, a design concept of operations is not required. Similar to conventional modems, the processing machine 202 can operate by simply plugging into a connector of a machine connected to the LAN 204.

The processing machine 202 is arranged for each of the transactions, and connected to the LAN 204 via the LAN processor 404. The transactions are broken down into segments within a range where no communications are required between each of the processing machines 202.

If a multiprocessing of the transactions is required, a plurality of the processing machines 202 are connected to the LAN 204 to run cooperatively. In this case, each of the processing machines 202 is configured based on a data-oriented design concept to individually access data stored in the data machine 203. To implement a data-oriented processing, the application program for the business transactions executed by the processing machine 202 is executed as an on-line program that communicates with the MMI machine 201 or the data machine 203 using electronic messages, to be described later. The electronic messages used in this case are standardized, as the messages which will be described later.

Figure 5:
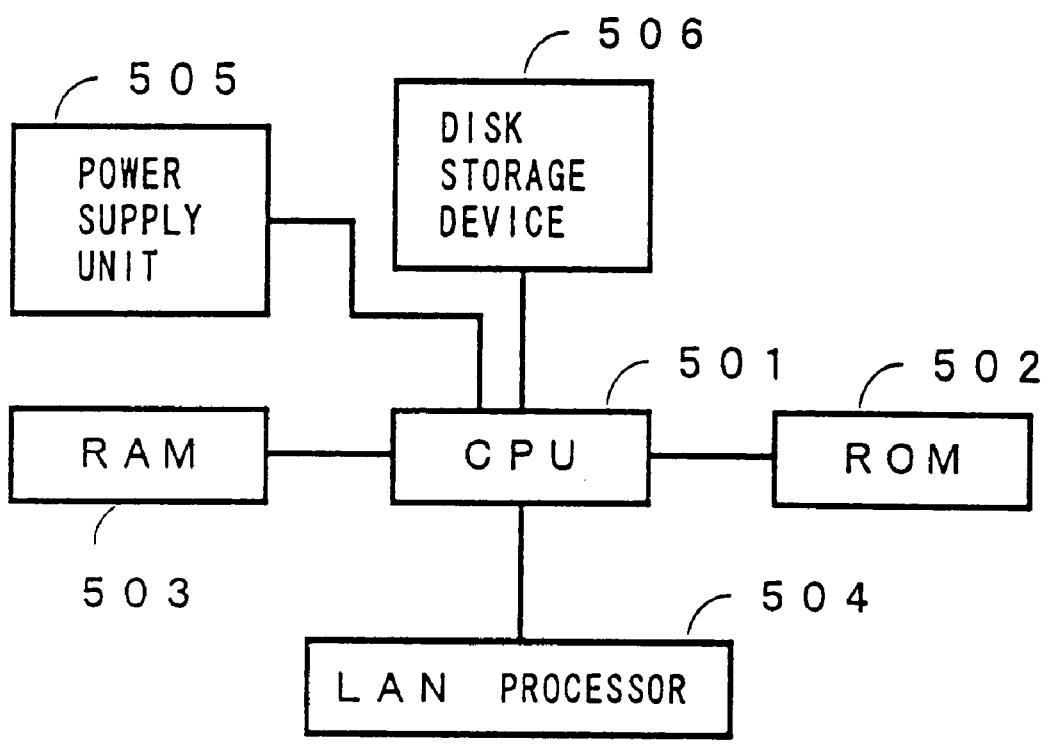
FIG. 5 is a block diagram of structure of a data machine and a network manager.

The data machine 203 is, what is called, a file server. Its capabilities are dedicated to data or database management capabilities. As shown in FIG. 5, for example, the data machine 203 consists of a CPU 501, a ROM 502, a RAM 503, a LAN processor 504, a power supply unit 505, a disk storage unit 506, etc.

Any format can be used for databases stored in the disk storage unit 506. Each database is managed by a dedicated utility machine, which is one of the processing machines 202, using a common method. Differences between the databases are removed by an interface unit included in the data machine 203.

External data entered via a gateway device, a magnetic tape (MT), a floppy disk device, etc. is stored in the data machine 203 by converting its format via the above described utility machines. A new database is built by a utility machine.

The local network manager 205 and the enterprise network manager 206 are types of the processing machines 202. Their structures are similar to that of the processing machine 202 shown in FIG. 4.

Next, structures of the electronic messages exchanged between the MMI machine 201, the processing machine 202, and the data machine 203 are shown in FIG. 6.

There are two types of the electronic messages: the messages A and B exchanged between the MMI machine 201 and the processing machine 202, and the messages C and D exchanged between the processing machine 202 and the data machine 203.

The electronic messages A and B exchanged between the MMI machine 201 and the processing machine 202 are structured as shown in FIG. 6A.

In this figure, an electronic message controller 601 at the beginning of a format is structured as shown in FIG. 6C.

In FIG. 6C, an electronic message identification code 609 indicates information for identifying message types such as a normal message A, B, etc., a message for automatically making a device connection definition, a message for distributing security information, etc.

A source ID 610 and a destination ID 611 are represented as global addresses of the LAN 204, for example, physical addresses (network addresses) assigned to the LAN processors 304, 404, and 504 of each machine.

A user ID 612 indicates a user that generates a message including it.

An electronic message identification serial number 613 indicates an order of transmitting the messages when information is divided into a plurality of messages to be transmitted.

A transmission time 614 indicates a time when a electronic message is transmitted. It is used for a fault examination, a response measurement, etc.

In FIG. 6A, a transaction ID 602 is an identifier for determining types of transactions such as a transaction of a received order table that requires a date and time process, a process of a balance sheet output, etc.

A screen ID 603 is an identifier for identifying one of a plurality of screens displayed on the display unit 306 included in the MMI machine 201 while processing one transaction.

Screen control information 604 is information for indicating that a screen is currently in a wait state or blinking, or information for controlling moving pictures displayed on the display unit 306 in the MMI machine 201.

Data area information 605 indicates how one or more sequential data areas 606 succeeding the data area information are used, for example, in which area data are currently stored.

The data area 606 holds screen input/output items for the display unit 306 of the MMI machine 201 for each data item.

Meanwhile, the electronic messages C and D exchanged between the processing machine 202 and the data machine 203 are structured as shown in FIG. 6B.

In FIG. 6B, an electronic message controller 601 at the beginning of a format has the same structure as the one shown in FIG. 6C, similar to that of the electronic messages A and B shown in FIG. 6A.

A transaction ID 602 is similar to that of the electronic messages A and B shown in FIG. 6A.

A file ID 607 is an identifier for identifying a file to be accessed.

For search control information 608, an additional search condition for specifying a transaction when searched data are duplicated, when data corresponding to a specified condition is not found, or when a search error occurs, during a search process performed for databases stored in the data machine 203, is set.

Data area information 605 is similar to that of the electronic messages A and B shown in FIG. 6A.

A data area 606 is also similar to that of the electronic messages A and B shown in FIG. 6A. The data area 606 of the electronic message C transmitted from the processing machine 202 to the data machine 203, stores a write condition described in the SQL language, which is one of the database programming languages, and a search key used at that time, if the electronic message C specifies a search process. If the electronic message C specifies write operations, the data area 606 stores written data. Meanwhile, the data area 606 of the electronic message D transmitted from the data machine 203 to the processing machine 202, stores resultant data of the search process or the write operations specified by the electronic message C.

Each of the above described electronic messages shown in FIG. 6 is stored in a data field of a packet transmitted via the LAN 204 according to protocols of the LAN 204.

Figure 7:
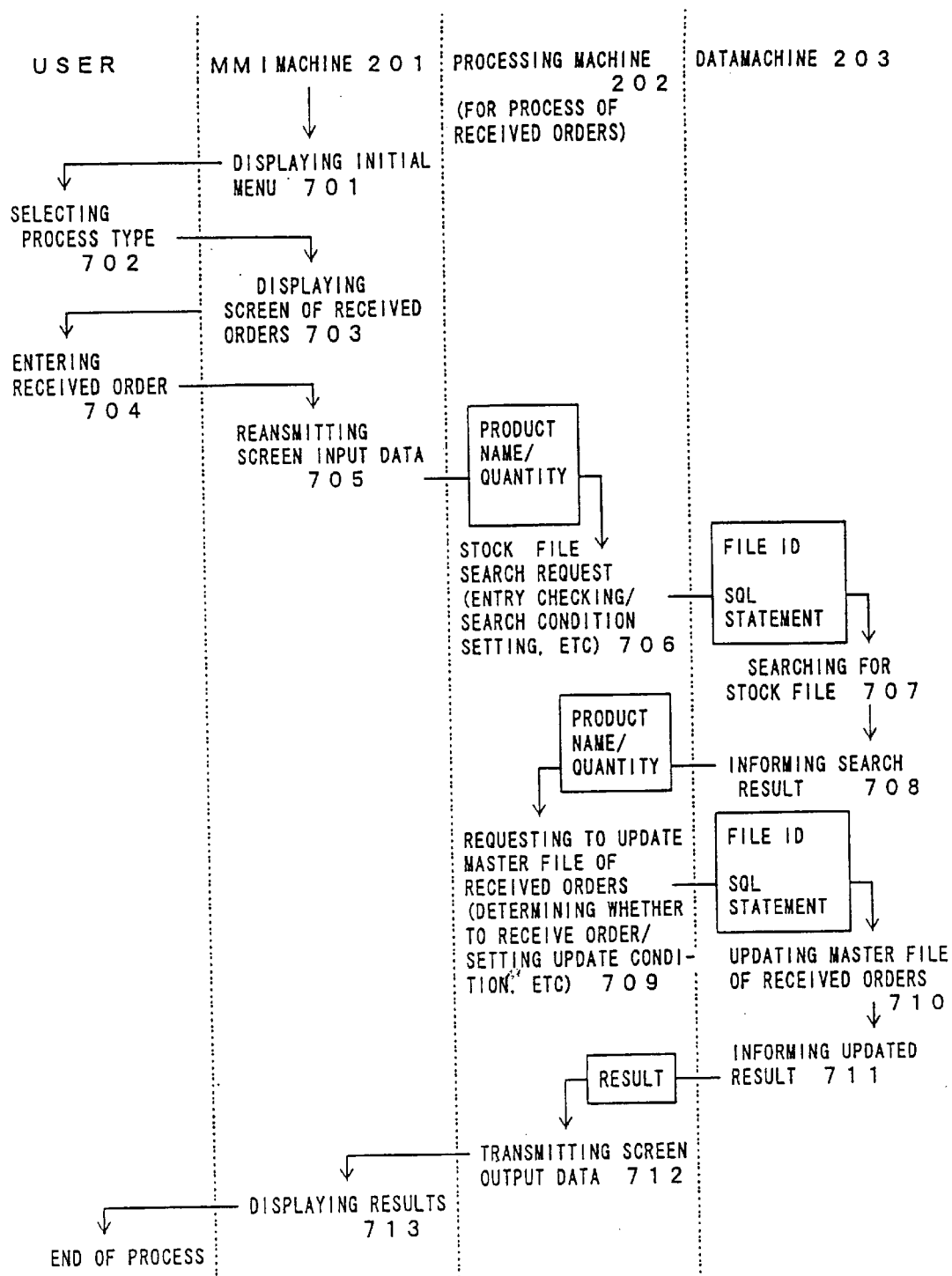
FIG. 7 is a schematic diagram showing operations performed in the first embodiment.

Next, explanation on operations of the business transaction implemented by the above described electronic messages, by referring to an example of operations performed for a received order, is shown in FIG. 7.

First of all, an MMI machine 201 displays an initial menu on a display unit 306 in Step 701.

If a user such as a phone operator selects one of received orders in Step 702, the MMI machine displays a received order screen on the display unit 306 in Step 703.

The user performs input operations for the received order on the received order screen in Step 704. The input items detail a product name, a product code, a quantity, etc.

The MMI machine 201 transmits the input items as an electronic message A to the processing machine 202 in Step 705.

The processing machine 202 searches stock files to check a stock. That is, the processing machine 202 generates an SQL statement that indicates a condition for searching the stock files according to the input items received from the MMI machine 201, stores the generated statement in an electronic message C along with a file ID, and transmits the electronic message C to the data machine 203 in Step 706.

The data machine 203 searches the stock files according to the contents of the electronic message C received from the processing machine 202 in Step 707, and informs the processing machine 202 of the searched results as an electronic message D in Step 708.

If the requested product is in stock, the processing machine 202 generates an SQL statement for requesting to update a master file of received orders, stores the generated statement in an electronic message C along with the file ID, and transmits the electronic message C to the data machine 203, so that the master file of received orders can be updated, in Step 709.

The data machine 203 updates the master file of received orders according to the contents of the electronic message C received from the processing machine 202 in Step 710, and informs the processing machine 202 of the updated results in Step 711.

When the data machine 203 informs the processing machine 202 of the updated results, the processing machine 202 transmits screen output data to the MMI machine 201 as an electronic message B in Step 712. The MMI machine then displays the results on the display unit 306 in Step 713.

In the above described transaction performed for received orders, the data machine 203 that holds the stock files may differ from the data machine 203 that holds the master file of received orders. The processing machine that performs the transaction for received orders is, for example, an identical machine.

Next, explanation on data structures and operations for access rights for accessing a user processing machine 202 and a data machine 203 is provided.

FIGS. 8A to 8E, based on the assumption that the MMI machine 201, the processing machine 202, and the data machine 203 are connected to the LAN 204, illustrates formats of electronic messages exchanged between these machines and the local network manager 205, or between the local network manager 205 and the enterprise network manager 206.

Figure 8A:
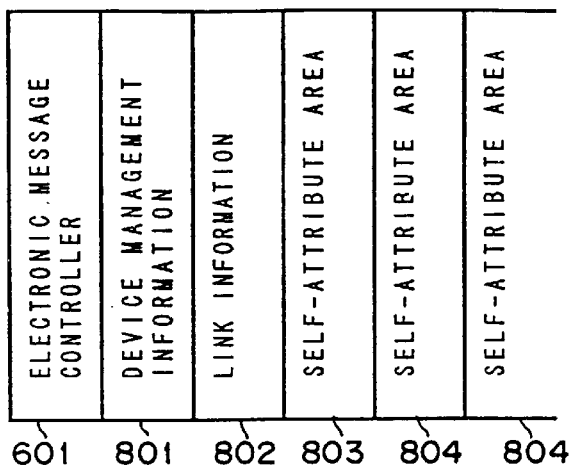
FIGS. 8A to 8E are schematic diagrams showing formats of second electronic messages.

The electronic messages E, G, and I are transmitted from the MMI machine 201, the processing machine 202, or the data machine 203, respectively, to the local network manager 205. The formats of these electronic messages are shown in FIG. 8A.

In this figure, an electronic message controller 601 at the beginning of the message has the same structure as the one shown in FIG. 6C, similar to the structures of the electronic messages A and B shown in FIG. 6A.

Device management information 801 is, so called, self-introduction information of a machine that transmits an electronic message including the device management information. This information does not depend on a business transaction. It includes an ID of each machine, an installation site, capabilities, a manager, a division or person to contact when a fault occurs, etc.

Link information 802 is information of addresses such as a global MAC address, a PU, an LU, etc. of the machine that transmits an electronic message including the link information.

Self-attribute area information 803 is information that indicates how one or more self-attribute areas 804 succeeding this information are used, for example, where data are currently stored.

The self-attribute area information 803 is essential. If a machine that transmits an electronic message including the self-attribute information is the MMI machine 201, information such as whether or not the machine employs a window system, a terminal type of that machine (a speech terminal, a graphics terminal, etc.), etc. is stored. If the machine that transmits the message including the self-attribute area information is the processing machine 202, information such as a type of a transaction, data types used for each transaction, etc. is stored in the self attribute area 804.

Meanwhile, electronic messages F, H, and J are transmitted from the local network manager 205 to the MMI machine 201, the processing machine 202, and the data machine 203. These messages are structured as shown in FIG. 8B.

Figure 8B:
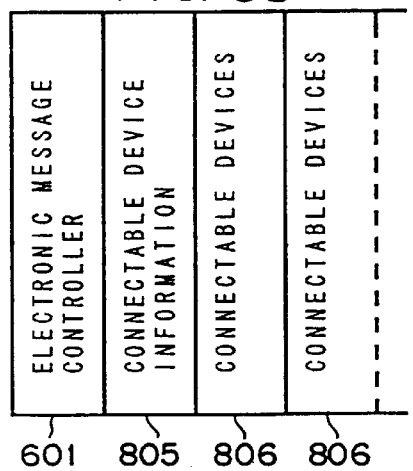

An electronic message controller 601 at the beginning of the message shown in FIG. 8B has the same structure as the one shown in FIG. 6A, similar to those of the electronic messages A and B shown in FIG. 6C.

Connectable device information 805 is information that indicates how one or more connectable device areas succeeding this information are used, for example, where data are currently stored.

Connectable devices 806 indicate a destination machine, to which an electronic message including the connectable devices is transmitted, is connected to which other machines.

Figure 8C:
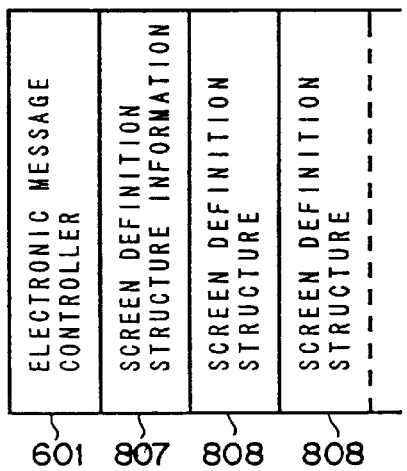

After the local network manager 205 transmits the electronic message H to the processing machine 202, the processing machine 202 transmits an electronic message M to the MMI machine 201. This message is structured as shown in FIG. 8C.

An electronic message controller 601 at the beginning of the message shown in this figure has the same structure as the one shown in FIG. 6C, similar to those of the electronic messages A and B shown in FIG. 6A.

Screen definition structure information 807 indicates how areas of one or more screen definition structures 808 succeeding this information are used, for example, where data are currently stored.

The screen definition structure 808 indicates information on a display screen, displayed by the MMI machine to which the electronic message is addressed, to be processed by the user, corresponding to a transaction performed by the processing machine 202 that transmits the electronic message including the screen definition structure 808.

Figure 8D:
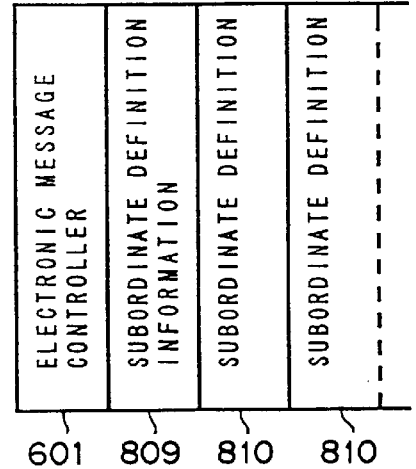

An electronic message K is transmitted from the local network manager 205 to the enterprise network manager 206. This message is structured as shown in FIG. 8D.

An electronic message controller 601 at the beginning of the message shown in this figure has the same structure as the one shown in FIG. 6C, similar to those of the electronic messages A and B shown in FIG. 6A.

Subordinate definition information 809 indicates how one or more areas of a subordinate definition 810 succeeding this information are used, for example, where data are currently stored.

The subordinate definition 810 indicates definitions of connecting the machines 201, 202, and 203, which are managed by the local network manager 205, that transmit an electronic message including this definition.

An electronic message L is transmitted from the enterprise network manager 206 to the local network manager 205. This message is structured as shown in FIG. 8E.

Figure 8E:
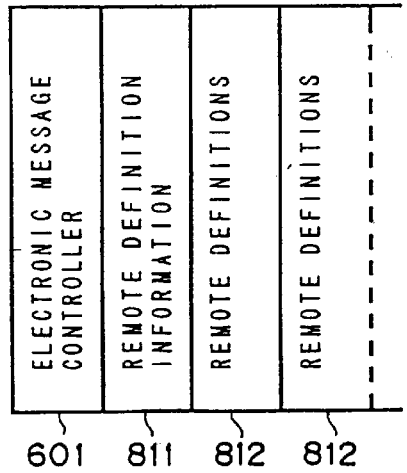

An electronic message controller 601 at the beginning of the message shown in FIG. 8E has the same structure as the one shown in FIG. 6C, similar to those of the electronic messages A and B shown in FIG. 6A.

Remote definition information 811 indicates how one or more areas of remote definition 812 succeeding this information are used, for example, where data are currently stored.

The remote definition 812 is connection information between each of the machines 201, 202, and 203 connected to one LAN 204 managed by the local network manager 205, to which an electronic message including this definition is transmitted, and each of the machines connected to another LAN 204.

Next, explanation on connection management tables managed by the local network manager 205 and the enterprise network manager 206 is provided.

The local network manager 205 manages the connection management table consisting of fundamental information 901 shown in FIG. 9A and connection information 902 shown in FIG. 9B. The local network manager 205 is a kind of processing machine 202, which is structured as shown in FIG. 4. The connection management table is stored in one of the data machines 203. The local network manager 205 accesses the data machine that stores the connection management table. In this case, the electronic messages C and D shown in FIG. 6C are used. If a local manager updates the connection management table managed by the local network manager 205, he or she accesses the local network manager 205 from one of the MMI machines 201. In this case, the electronic messages A and B shown in FIG. 6A are used.

In the fundamental information 901 shown in FIG. 9A one line of a record corresponds to one machine.

A data item 903 indicates which machine the record corresponds to. A machine ID included in the device management information 801 (see FIG. 8A) in the electronic messages E, G, and I informed by that machine, for example, is set in the data item.

A data item 904 is determination information for determining whether or not a machine corresponding to the record is connected to the LAN 204, to which the local network manager 205 indicated by the data item 904 is connected (whether or not it is connected to a local network), or whether or not it is connected to an other LAN (whether or not it is connected to a remote network). A record with an identifier "remote" added is always appended to the fundamental information according to an instruction given by the enterprise network manager 206.

A data item 905 indicates address information corresponding to that record, such as a global MAC address, a PU, an LU, etc. The link information 802 (see FIG. 8A) of the electronic messages E, G, and I informed by that machine is set in the data item 905.

A data item 906 indicates attributes of the machine corresponding to that record. Information of the self-attribute areas 804 (see FIG. 8A) included in the electronic messages E, G, and I informed by that machine is set in the data item 906.

Figure 11A:
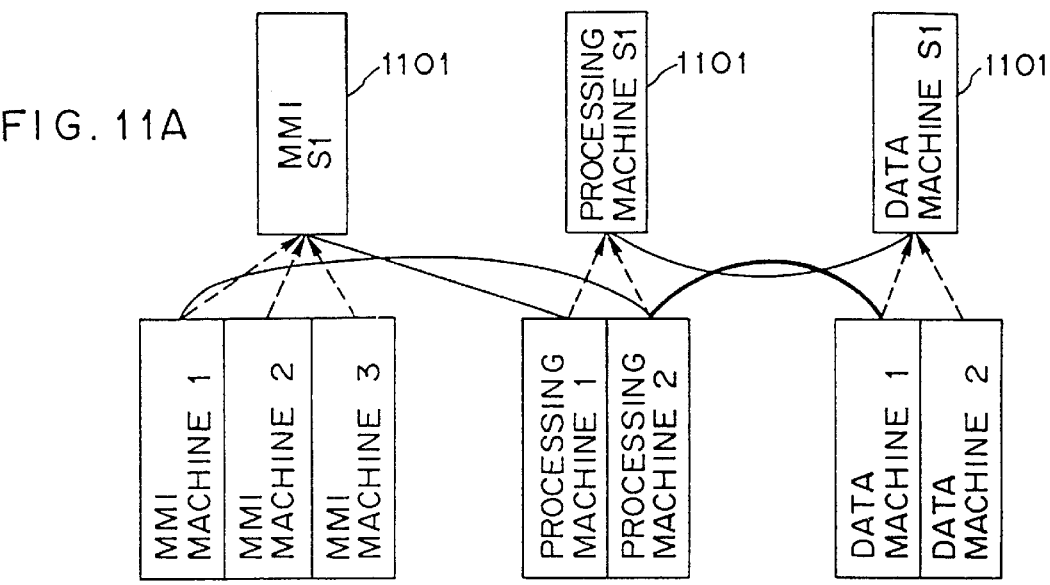
FIGS. 11A and 11B are block diagrams showing structures of connection information using super-classes.

The connection information 902 shown in FIG. 9B indicates information on how the MMI machine 201, the processing machine 202, and the data machine 203 are connected in a predetermined data format. This connection information 902 may be set by directly defining connections between the machines, or by defining connections between the machines using superclasses 1101 shown in FIG. 11A if the number of machines (nodes) is large and the definitions are complicated. In the example shown in FIG. 11A, an "MMI S1" is defined for the MMI machines 1 through 3 (corresponding to the MMI machine 201 shown in FIG. 2), a "processing machine S1" is defined for the processing machines 1 and 2 (corresponding to the processing machine 202 shown in FIG. 2), and a "data machine S1" is defined for the data machines 1 and 2 (corresponding to the data machine 203 shown in FIG. 2), as respective superclasses 1101. In addition to the connection definitions between the superclasses 1101, direct connection definitions between the machines, and direct non-connection definitions (for specifying no connection should be made), etc. are shown as mixed definitions in this figure. Furthermore, the superclasses can be defined hierarchically. If the definition between the superclasses 1101 differs from the direct definition between the machines, the latter takes precedence over the former. If the connection definition differs from the non-connection definition, the latter takes precedence over the former. If appropriate access rights are set, a priority is given to a definition including a weaker access right.

Meanwhile, the enterprise network manager 206 manges a connection management table consisting of entire information 1001, fundamental information 1002, and connection information 1003 shown in FIGS. 10A, 10B and 10C respectively. Similar to the local network manager 205, the enterprise network manager 206 is a kind of processing machine 202, which is structured as shown in FIG. 4, for example. The connection management table is stored in one of the data machines 203. The enterprise network manager 206 accesses the data machine 203 holding the connection management tables. If an enterprise manager updates the connection management table managed by the enterprise network manager 206, he or she accesses the enterprise network manager 206 from one of the MMI machines 201.

Figure 11B:
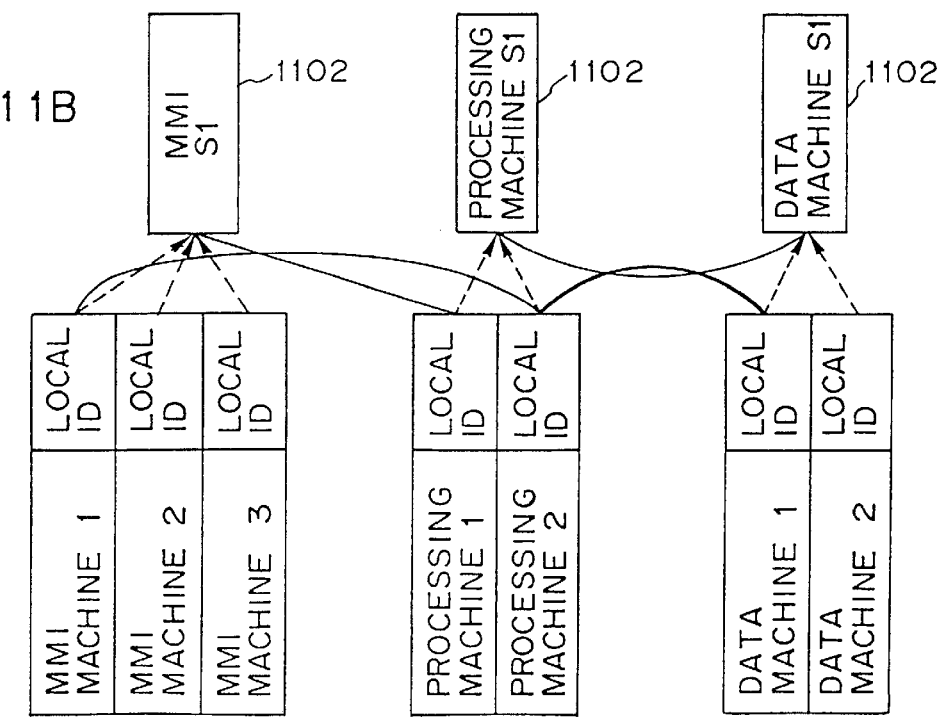

The fundamental information 1002 shown in FIG. 10B and the connection information 1003 shown in FIG. 10C are basically and respectively the same as the fundamental information 901 shown in FIG. 9A and the connection information 902 shown in FIG. 9B, informed by the local network manager 205 and managed by the enterprise network manager 206 that manages the connection management table including the fundamental information 1002 and the connection information 1003. However, the fundamental information 1002 shown in FIG. 10B does not require the data item 904 required for the fundamental information 901 shown in FIG. 9A. Alternatively, the fundamental information 1002 includes a data item 1004 where a local ID indicating which LAN 24 each record belongs to. The connection information 1003 also includes a data item 1005 where a local ID indicating which LAN 204 each machine described in the information belongs to. Similar to the connection information 902 (shown in FIG. 9B) managed by the local network manager 205, connections between the machines may be defined using superclasses 1102 shown in FIG. 11B if the number of machines (nodes) are large and the definitions are complicated.

A record in one line included in the entire information 1001 shown in FIG. 10A corresponds to one LAN 204. Each record consists of a data item 1006 where a local ID identifying each LAN 204 is set, a data item 1007 where remote link information, which is the link information for making remote accesses to each LAN 204, is set, and a data item 1008 where attributes of the link are set.

Figure 12:
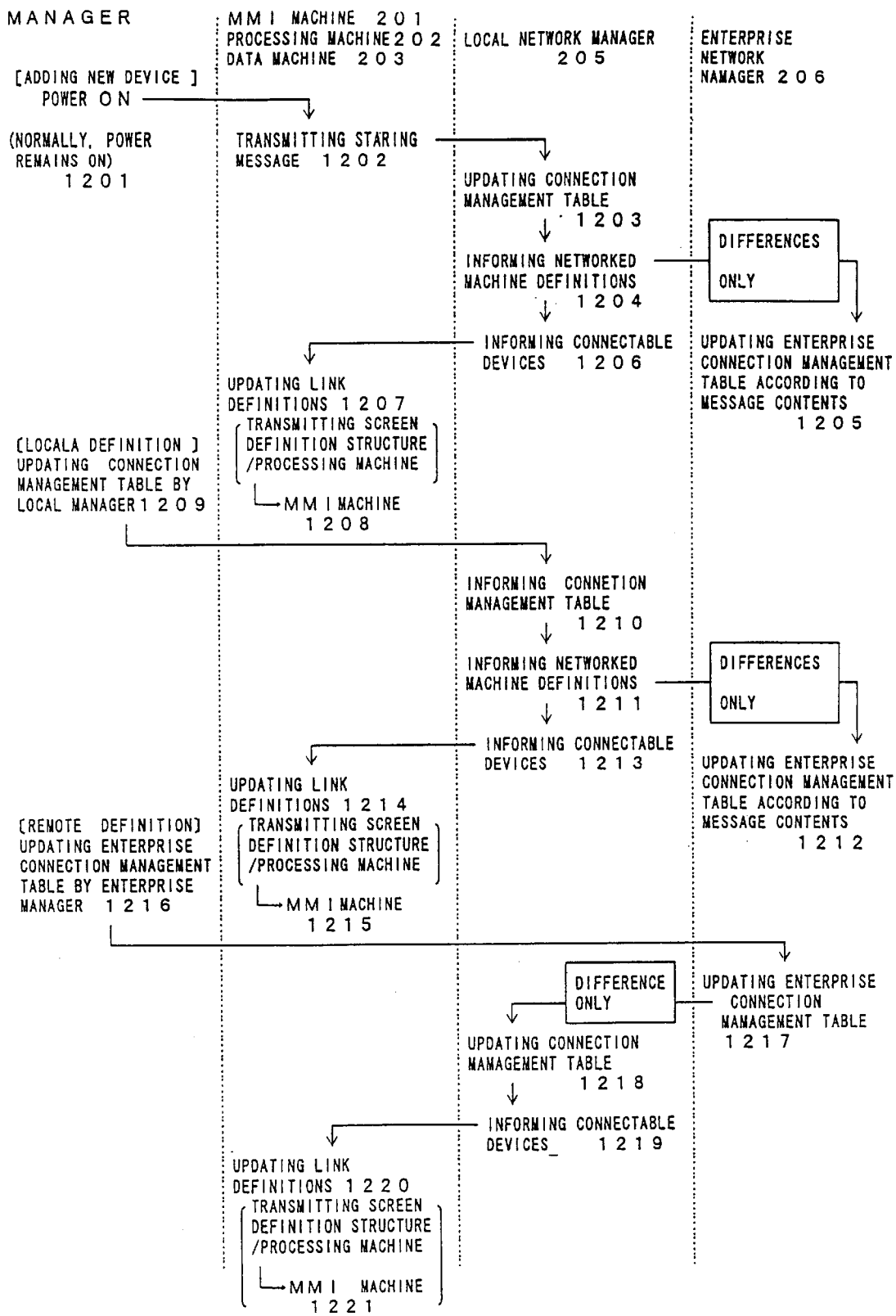
FIG. 12 is a schematic diagram showing operations performed in the second embodiment.

Operations of automatically generating/updating the device connection definitions and those of updating the link definition for each machine implemented by the electronic messages shown in FIGS. 8A to 8E and the connection management tables shown in FIGS. 9A and 9B and 10A to 10C are described below, referring to the operations shown in FIG. 12.

The link definition for each machine is updated in the following three cases:

1. New device addition: When a local manager connects a new machine to a LAN.
2. Local definition: When the local manager modifies the device connection definition of the LAN that the local manager manages.
3. Remote definition: When an enterprise manager modifies the device connection definitions for a plurality of LANs (domains).

First of all, an example of the operations when the new device is added is provided below.

The local manager connects the new machine, which is one of the MMI machine 201, the processing machine 202, and the data machine 203, to the LAN 204, specifies only an address of a local network manager 205 for managing the LAN 204, and powers up the machine in Step 1201.

As a result, the power-supplied machine (one of 201, 202, and 203, hereafter referred to as a newly-added machine) transmits a connection start message using any of the electronic messages E, G, and I shown in FIG. 8A to the local network manager 205 in Step 1202.

When receiving the above described message, the local network manager 205 newly adds a record corresponding to the newly-added machine that transmits the message, to the fundamental information 901 (shown in FIG. 9A) included in the connection management table that the local network manager 205 itself manages, and updates the connection management table in Step 1203. In the data item 903 shown in FIG. 9A, the machine ID included in the device management information 801 (see FIG. 8A) in the received message is set. In the data item 904, the identifier "local" is set. In the data item 905, the link information 802 (see FIG. 8A) included in the received message is set. In the data item 906, the information of the self-attribute area 804 included in the message is set. The local network manager 205 sets information indicating that a connection can be made only to a specific MMI machine 201 as the connection information 902 (see FIG. 9B) included in the connection management table.

The local network manager 205 then informs the enterprise network manager 206 of the above described newly-added record definitions (networked machine definitions) using the electronic message K shown in FIG. 8D in Step 1204.

When receiving the above described message, the enterprise network manager 206 adds a new record corresponding to the subordinate definition 810 (see FIG. 8D) included in the received message, to the fundamental information 1002 (shown in FIG. 10B) included in the connection management table managed by the enterprise network manager 206 itself, and updates the connection management table in Step 1205.

Additionally, the local network manager 205 informs the enterprise network manager 206 of the networked machine definitions, and at the same time, informs the newly-added machine that transmits the electronic message received during the transaction performed in Step 1202, of information on the connectable devices 806 using any of the electronic messages F, H, and J in Step 1206. As the information on the connectable devices 806, information indicating that a connection can be made only to a specific MMI machine 201 is set by default, for example.

When receiving the above described electronic message, the newly-added machine updates the link definitions set in a RAM built into the machine, according to the information on the connectable devices included in the received message in Step 1207. The link definition is a file for defining machines that can be connected to that machine and attributes of the link to be connected (such as a transfer rate, a protocol, etc.), etc. Each machine communicates with other machines according to the attributes defined in the file. This link definition is made, for example, in a memory of each machine, and lost when powered down. That is, the local network manager 205 provides the machine with the information on the link definition each time the machine is connected to the LAN 204.

If the newly-added machine is a processing machine 202, it transmits a screen definition structure for a default screen displayed by the MMI machine 201, to the connectable MMI machine 201 informed by the local network manager as a default machine during the transaction performed in Step 1206, using the electronic message M shown in FIG. 8C in Step 1208. As a result, the above described MMI machine 201, which is not shown in the figure, displays a screen corresponding to the informed screen definition structure.

If one machine is disconnected from the LAN 204 during the above described transaction, the information indicating the disconnection between that machine and the LAN 204 is appended, though the information on that machine is not removed from the connection management table. Next time the machine is re-connected to the LAN 204, a local definition, which will be described hereafter, is not required to be made again by searching the connection management table for a record corresponding to that machine, each time the machine is connected/disconnected to/from the LAN 204.

Next, an example of operations performed for a local definition is described.

When a local manager needs to change device connection definitions for a LAN that he or she manages, such as when he or she needs to make a further detailed connection definition for a new machine after it is added, the local manager invokes a capability for updating connection management tables, from the MMI machine 201 accessible to a local network manager 205, to give an instruction for updating the connection management table, using a display screen for updating the connection management tables in Step 1209. Then, the above described MMI machine instructs the local network manager to update the connection management table using the electronic message A shown in FIG. 6A, though this operation is not shown in FIG. 12.

When receiving the above described electronic message, the local network manager 205 performs the update process specified by the received electronic message, for the fundamental information 901 (shown in FIG. 9A) or for the connection information 902 (shown in FIG. 9B) included in the connection management table that the local network manager 205 manages, so that the connection management table is updated in Step 1210.

Then, the local network manager 205 informs the enterprise network manager 206 of the updated record definitions (networked machine definitions) using the electronic message K shown in FIG. 8D in Step 1211.

When receiving the electronic message, the enterprise network manager 206 updates the record corresponding to the subordinate definition 810 (see FIG. 8D) in the fundamental information 1002 (shown in FIG. 10B) or in the connection information 1003 (shown in FIG. 10C) included in the connection management table that the enterprise network manager 206 manages, so that the connection management table is updated in Step 1212.

The local network manager 205 informs the enterprise network manager 206 of the networked machine definitions, and at the same time informs the machine to be updated in the connection management table of the information on the connectable devices 806, using any of the electronic messages F, H, and J shown in FIG. 8B in Step 1213.

When receiving the above described electronic message, each machine updates the link definition set in a RAM built into that machine according to the information on the connectable devices 806 included in that message in Step 1214.

If the above described machine is a processing machine 202, it transmits the screen definition structure of a screen displayed by the above described MMI machine 201, corresponding to the transaction performed by the processing machine 202, to the MMI machine 201 connected to the processing machine 202, using the electronic message M shown in FIG. 8C in Step 1215. As a result, the above described MMI machine 201 displays the screen corresponding to the informed screen definition structure, though this operation is not shown in FIG. 12.

Lastly, an explanation on operations of a remote definition is provided.

If an enterprise manager needs to change device connection definitions between a plurality of LANs that he or she manages, the enterprise manager invokes an update capability of the connection management table from the MMI machine 201 accessible to the enterprise network manager 206, to give an instruction of updating the connection management table, using the display screen for updating the connection management tables in Step 1216. As a result, despite being not shown in FIG. 12, the above described MMI machine 201 instructs the enterprise network manager 206 to update the connection management table using the electronic message A shown in FIG. 6A.

When receiving the above described message, the enterprise network manager 206 performs the update process specified by the received electronic message, for the entire information 1001 (shown in FIG. 10A), the fundamental information 1002 (shown in FIG. 10B), or the connection information 1003 (shown in FIG. 10C), included in the connection management table that the enterprise network manager itself manages, so that the connection management table is updated in Step 1217.

The enterprise network manager 206 then informs the local network manager 205 corresponding to the local ID set in one of the data items 1004, 1005, and 1006 in the record to be updated, of the above described updated record definition (remote definition) in Step 1211.

When receiving the above described electronic message, the local network manager 205 updates the record corresponding to the remote definition 812 (see FIG. 8E) included in the received message, in the fundamental information 901 (shown in FIG. 9A), or in the connection information 902 (shown in FIG. 9B) included in the connection management table that the local network manager 205 itself manages, so that the connection management table is updated in Step 1218.

Furthermore, the local network manager 205 informs the machine to be updated in the connection management table of the information on the connectable devices 806, using any of the electronic messages F, H, and J shown in FIG. 8B in step 1219.

When receiving the above described message, each machine updates the link definition set in a RAM built into that machine according to the information on the connectable devices 806 included in that message in Step 1214.

If the above described machine is a processing machine 202, it transmits the screen definition structure of a screen displayed by the above described MMI machine 201, corresponding to the transaction performed by the processing machine 202, to the MMI machine 201 connected to the processing machine 202, using the electronic message M shown in FIG. 8C in Step 1221. As a result, the above described MMI machine 201 displays the screen corresponding to the informed screen definition structure, though this operation is not shown in FIG. 12.

Next, data structures and operations for managing access rights of respective users for accessing a processing machine 202 and a data machine 203 are described below.

Figure 13:
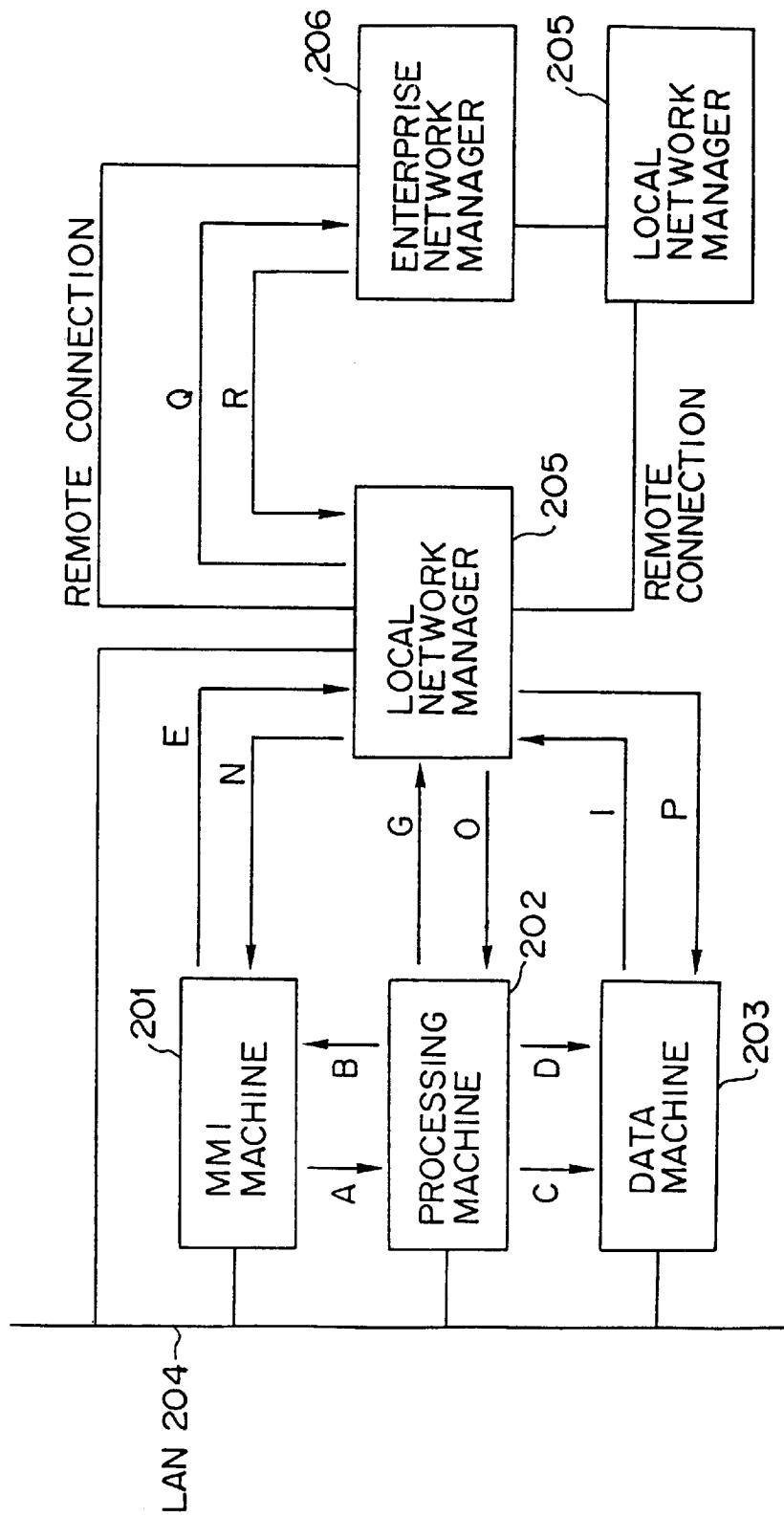
FIG. 13 is a block diagram showing a configuration of a third embodiment according to the present invention.

FIG. 13 is a system configuration of another embodiment for defining access rights of respective users for accessing the processing machine 202 and the data machine 203, according to the present invention.

Since the configuration shown in FIG. 13 is similar to that of the embodiment of the device configuration shown in FIG. 2, the explanation is abbreviated.

The operations specific to the embodiment shown in FIG. 13 are described below.

The local network manager 205 manages security by controlling user access rights for accessing the processing machine 202 and the data machine 203 connected to the LAN 204 to which the local network manager 205 is connected. The enterprise network manager 206 manages the security between the LANs as well as the local network manager 205 that is connected to a LAN, which is connected to the enterprise network manager and remote-connected to other LANs 204. When a new user joins the LAN 204 that the local manager manages, he or she lets the local network manager 205 manage the access rights of respective users for accessing the processing machine 202 and the data machine 203. The local network manager 205 informs the enterprise network manager 206 of the management information to be managed. The local network manager 205 distributes information of the access rights to the machines 201, 202, and 203, connected to the LAN 204 to which the local network manager 205 is connected. Each machine takes advantage of that information. Both the local network manager 205 and the enterprise network manager 206 also manage a logging and a notification of fault information. In FIG. 13, the electronic messages E, G, and I that are transmitted from the MMI machine 201, the processing machine 202, and the data machine 203 respectively to the local network manager 205, have the same structures as those shown in FIG. 8.

FIG. 14 shows formats of electronic messages used in the embodiment shown in FIG. 13.

An electronic message controller 601 at the beginning of the message shown in this figure has the same structure as the one shown in FIG. 6C, similar to those of the electronic messages A and B shown in FIG. 6A. In FIGS. 14A, B, and C, user ID information 1401 indicates how one or more user ID areas succeeding this information are used. User IDs 1402 and 1403 included in the electronic message N shown in FIG. 14A store each user ID only. The user IDs only are transmitted to the man-machine interface machine 201. User IDs 1412 and 1413 included in the electronic message O store each user access right for each processing machine, conforming to an ID table, to be described later, as shown in FIG. 14B. The local network manager 205 transmits the electronic message O to the processing machine 202. User IDs 1422 and 1423 included in the electronic message P store each user access right conforming to a file access right table, to be described later, as shown in FIG. 14C. The local network manager 205 transmits the electronic message P to the data machine 203. Subordinate definition 1432 and 1433 included in the electronic message Q store the access right information for the man-machine interface machine 201, the processing machine 202 and the data machine 203 that are connected to the local network manager 205. The access right information is transmitted to the enterprise network manager 206. Subordinate definition information 1431 included in the electronic message Q indicates how areas of the subordinate definition are used. Remote definition information 1441 included in the electronic message R indicates how remote definitions 1442 and 1443 succeeding this information are used. The remote definitions 1442 and 1443 included in the message store the user access right information for a processing machine 202 and a data machine 203 as shown in FIG. 14E. The enterprise network manager 206 transmits the access right information to the local network manager 205 as remote definition information.

Next, explanation on structures of an ID table 1501 for specifying the access right of each user for accessing a processing machine 202 and a file access right table 1502 for defining the access right for accessing the data machine 203 is provided. The ID table 1501 indicates whether or not each user is a superuser, whether or not the user can read and write (RW), or whether or not the user can reference only, for the processing machine. In FIG. 15, a user ID1 becomes a superuser for the transactions 1, 2, and 3 indicated by each ID of the processing machine 202. A user ID2 is allowed to be referenceable only (R), readable and writable (RW), and referenceable only (R), respectively for the transactions 1, 2, and 3 indicated by each ID of the processing machines 202. A user ID3 becomes readable and writable (RW) for a transaction 2 indicated by each ID of the processing machine 202. The access right is set for each user according to a transaction performed by the processing machine. It is possible to let one processing machine 202 perform only one transaction, and set the access right for that processing. It is also possible to let one processing machine perform a plurality of transactions, and set each user access right for each transaction.

The file access right table 1502 defines each user as a superuser (S), readable and writable (RW), or referenceable only (R), for the data items of each file handled by the data machine 203.

Each of the user IDs ID1, ID2, and ID3 possesses the access right to the data items 1, 2, and 3 of the file IDs for each data machine. For one data machine 203, different file access right may be defined for each data item. The file IDs and the data items correspond to a file ID and a data area of an electronic message C transmitted from the processing machine 203 to the data machine 203. When each user transmits the electronic message C to the data machine 203 via the processing machine 202, whether or not the user can access the data items of the file ID handled by the data machine 203 is defined.

The ID table 1501 and the file access right table 1502 are generated in the data machine 203. The local area network manager 205 manages the user file access right by accessing the data machine 203.

If a new user joins a network, the access rights of respective users for accessing a processing machine 202 and a data machine 203 are registered in the respective ID table 1501 and the file access right table 1502.

A registered portion corresponding to each processing machine in the ID table 1501 is transmitted from the local network manager 205 to each processing machine 202, using the electronic message O, and stored in a memory of each processing machine 202. Accordingly, for the transaction 1 performed by each processing machine 202, the user ID2, for example, attempts to perform a write operation, the access right of the user ID2 is refused as being non-writable, according to the ID table stored in the processing machine 202.

Similarly, a portion corresponding to each data machine included in the file access right table 1502, is transmitted from the local network manager 205 to the data machine 203, using the electronic message P, and stored in a memory of each data machine. Accordingly, the user ID2 attempts to rewrite the data item 1 in the data machine, the access made by the user ID2 at that time is refused since the user ID is referenceable only.

If a plurality of users attempt to access the processing machine 202 at the same time, putting the electronic messages for requesting accesses by the users in a queue, which is not shown in FIG. 15, arranges the order of accesses made by the users. Similarly, if the plurality of users attempt to access a specific data item in the data machine 203, putting the electronic messages for requesting accesses in the queue arranges the order of accesses.

Both the ID table 1501 and the file access right table 1502 are set independently from the device connections made between the processing machine 202, the data machine 203, and the man-machine interface machine 201. Even if the man-machine interface machine 201 is connected to the processing machine 202 or the data machine 203, a user cannot access the processing machine or the data machine when the user does not have the access right for accessing the processing machine or the data machine.

Since the access right to a transaction performed by the processing machine or to a data item handled by the data machine is defined for each user, security can be maintained.

In the above described embodiment each of the processing machine, the data machine, and the MMI machine is dedicated to a specific use, and connected to a network, and the access rights of respective users to a transaction performed by a processing machine, and to a data item of the file ID included in the data machine, are defined. Accordingly, also in a configuration where the processing machine, the data machine, and the MMI machine, are dedicated to specific uses as described above described, the security of the processing machine and the data machine can fully be maintained and improved.

For the security, the user access right must satisfy the access right tables of both the processing machine and the data machine. In addition, an appropriate man-machine interface machine, processing machine, and data machine must be connected. Thus, the security can fully be assured due to the above described triple checking.

This embodiment defines the access rights of respective users for accessing a processing machine and a data machine so that a can design a computer system based on a concept of corresponding to a situation where the user lets a person responsible for a business transaction perform it, or a situation where the user makes specific data accessible. That is, that the user lets the person who is responsible for the business transaction perform it, corresponds to the user defining an access right to the processing machine using an ID table 1501. Whether or not the user can access the specific data, corresponds to managing whether to allow the user to access the data machine using a file access right table 1502. Accordingly, even if the user is not familiar with computer systems, or operating systems in particular, he or she can easily arrange an ID table and the file access right table for defining accesses to the processing machine and the data machine, as if he or she lets the responsible person perform a normal transaction by taking advantage of the specific data.

FIG. 16 shows an ID table 1601 and a file access right table 1602 managed by the enterprise network manager. The sole difference between the tables shown manager. The sole difference between the tables shown in FIG. 15 and the tables shown in FIG. 16 is that local IDs for indicating on which local network processing machines and data machines exist, are added to FIG. 16. That is, the enterprise network manager 206 allows access rights of respective users for accessing the processing machines and the data machines on each local network, to be established.

FIG. 17A shows structures of an ID table 1701 and an file access table 1702 using superclasses. A transaction S1 is a superclass for a processing machine ID and a transaction ID. A user S1 is a superclass for a user ID1 and a user ID2. Similar to the superclasses when connecting the devices, superclasses for an access right management table also facilitate making the entire processing simple and understandable by making definitions using the superclasses, if there are a number of nodes and definitions are complicated. If a definition of the superclass is different from an individual definition, the latter takes precedence over the former. For example, the user ID1 is a superuser for the superclass S1, but not a definition for the transaction 1 of the processing machine ID. Since the user ID2 is referenceable only (R) for the transaction S1 of the superclass, the user ID2 will be readable and writable for the transaction 2 of the processing machine ID. The individual definition takes precedence over the definition of the superclass.

FIG. 17B shows an ID table 1703 and a file access right table 1704, both managed by an enterprise network manager. The sole difference between the FIG. 17A and this figure is that local IDs are added to the processing machine IDs and the data machine IDs.

Figure 18:
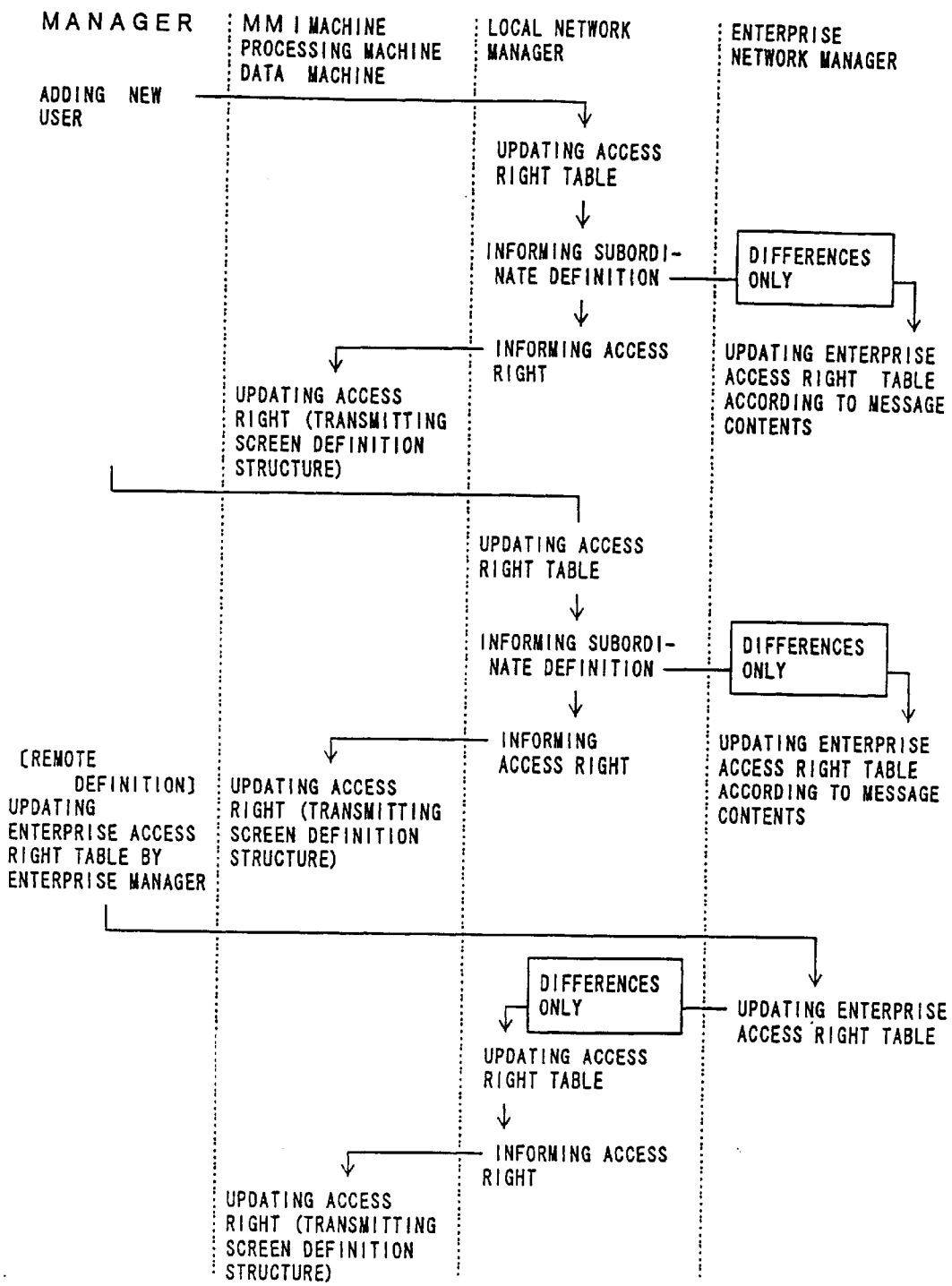
FIG. 18 is a schematic diagram showing operations when using an access right management table.

Next, explanation on operations when using the access right management table is given below referring to FIG. 18. First of all, when a new user is added, a local area network manager 205 updates an ID table and a file access right table, and informs the differences in updated networked machine information to an enterprise network manager 206, so that the ID table and the file access right table that the local network manager 205 itself manages are updated. Additionally, the local network manager 205 transmits data of the new user included in the ID table and the file access right table, to the MMI machine 201, the processing machine 202, and the data machine 203, using electronic messages N, O, and P, respectively. Then, it transmits a screen definition structure where definitions of the ID table and the access right table are changed, to the MMI machine 201.

If a local manager updates the access table, the ID table and the file access right table are updated whenever the access rights of respective users for accessing a processing machine and a data machine are modified. Then, only the differences in networked machine definitions are transmitted to the enterprise network manager 206, the modified access rights of respective users are transmitted to the MMI machine, the processing machine, and the data machine, the screen definition structure, for example, is updated, and it is displayed on a screen of the MMI machine.

For remote definitions, an enterprise manager updates an access right table. Only the differences in updated results of an ID table and the access right table, which are managed by a corresponding enterprise network manager 206, are transmitted to the access right table managed by the local network manager 205, so that the ID table and the access right table are updated. The local network manager 205 transmits modifications of the updated user access right to the MMI machine, the processing machine, and the data machine, so that a screen definition structure is modified depending on the modifications of the access right, and is displayed on a screen of the MMI machine.

In the above described embodiment, the processing machine, the data machine, and the MMI interface machine are connected over a network. Alternatively, they may be connected via a bus.

In the embodiment described above described, the capabilities of a computer system are divided into an MMI (man-machine interface) capability, a processing capability, and a data capability. This embodiment implements a configuration where machines are dedicated to the above described capabilities, such as the MMI machine 201, the processing machine 202, and the data machine 203, are connected over the LAN 204.

As described above, interconnecting hardware devices dedicated to specific capabilities over a network simplify conventionally expanded system configurations. The capabilities of the processing machine are made simple as shown in FIG. 4, etc., and the hardware and the software for processing transactions are integrated and provided as one body, and it is guaranteed that each hardware executes its specific software. Accordingly, for memory management, fixed memory areas are allocated, and controls such as a virtual memory space control, etc. are no longer required. Thus, a control for swapping-in or swapping-out of the program data becomes unnecessary. Since task control is implemented as single task control, controls such as transaction management, priority management, etc. also become unnecessary. Thus, for the processing machine 202, almost none of the capabilities required for conventional operating systems are necessary. Since the data machine 203 may be equipped only with capabilities such as a data search capability, a data update capability, and a data read/write capability, its capabilities are also greatly simplified. Furthermore, the MMI machine 201 may be implemented without a data storage capability, and with a man-machine interface capability only. Accordingly, the MMI machine 201 can easily be provided by a conventional device such as a personal computer.

By simplifying a computer system as described above described, the reliability of the entire computer system can significantly be improved and a cheaper CPU can be used for a device such as the processing machine 202, etc. As a result, the cost performance of a computer system will also be significantly improved. Depending on changes of a transaction, one or more machines may be added or replaced to configure a flexible, efficient and expandable computer system. Furthermore, if a data machine 203 is provided for each database, one particular transaction cannot cause a delay to another transaction. Since the processing machine and the MMI machine are provided as integrated software and hardware, they can be set up by simply connecting to a LAN 204 and supplying power. If an error occurs, the entire machine may be replaced. With this invention implemented, a local network manager 205 and an enterprise network manager 206 intensively manage information on connecting the machines 201, 202, and 203 to the LAN 204. If a new device is additionally connected, it automatically transmits any of the electronic messages E, G, and I including the connection information, to the LAN 204. Accordingly, operating management and fault management for the entire computer system are centralized in the local network manager 205, the enterprise network manager 206, the LAN 206 (network), and the data machine 203, so that the computer management can be greatly simplified.

As the second advantage implemented by this invention, connecting machines equipped with dedicated capabilities over a network facilitates the standardizing of communications protocols between the machines. Specifically, communications between the machines are standardized as electronic messages at a transaction level, which consist of information that can easily be identified, such as a user ID 612, a transaction ID 602, a screen ID 603, a file ID 607, an SQL statement, etc. By taking advantage of these messages, a transaction is requested to the machines with respective dedicated, independent and specific capabilities. As a result, each of the machines can be reused and duplicate development thereof can be reduced.

As the third advantage, it is possible to make a configuration and execution status of a computer system correspond to the organization and methods for processing jobs in companies. As a result, an expert in a certain business field, who is not so familiar with computers and networking, can easily configure a system. Specifically, in the definitions of the connection information (definitions of device connections) managed by either the local network manager 205 or the enterprise network manager 206, the MMI machine 201, the processing machine 202, and the data machine 203 respectively and directly correspond to transacthe local network manager 205 or if an enterprise manager makes a remote definition for the enterprise network manager 206, no special knowledge of computers and networking is required. As described above described, work load and cost of both a vendor and a client will significantly be reduced when configuring their computer systems. Furthermore, since a hierarchical structure of device connection definitions consisting of the local network manager 205 and the enterprise network manager 206 may correspond to that of a transaction, management of the device connection definitions can be made intuitive.

As the fourth advantage, it is possible to establish a data center for concentratedly managing data. This is because the data machine 203, is connected to a LAN 204, or another LAN, or a public network, as an independent component, and accesses are standardized as electronic messages at a transaction level. As a result, costs and risks of data management can be significantly reduced.

Unlike with conventional systems, electronic messages are transferred by each transaction process in the embodiment described above described. Therefore, network traffic does not adversely increase. While accessing databases included in the data machine 203, for example, transaction files, etc. are retrieved to the processing machine 202, stored in a memory and processed at the same time.

The present invention defines access rights of respective users for accessing each transaction performed by each processing machine, and each data item included in each file in each data machine. Since definitions depending on an access right such as whether or not a user becomes a superuser, whether or not the user can perform read or write operations, or whether or not the user can perform references only, etc., to a processing machine or a data machine, can be made for respective users, security can be much more assured.

The access rights of respective users for accessing a plurality of data machines and a plurality of processing machines in a local area network via an enterprise network manager can also be defined. Accordingly, the security between a plurality of local networks such as the ones connected by the enterprise network can be assured.

What is claimed is:

1. A processing machine, comprising:
   an electronic message transmission/reception unit receiving a first electronic message including a request for a transaction process, transmitting a second electronic message including results of the transaction process, transmitting a third electronic message including a request for data accesses, and receiving a fourth electronic message including results of the data accesses, wherein the first, second, third, and fourth electronic messages have respectively standardized formats;
   a dedicated transaction execution unit executing one dedicated transaction process or a limited number of dedicated transaction processes corresponding to the first and second electronic messages; and
   an access right control unit controlling an access right of a user based on a type of the access right of the user, the type of access right being defined according to each of the transaction processes,
   wherein the processing machine is connected to a data machine that stores data generated by a different machine.

2. The processing machine according to claim 1, wherein the access right control unit controls the access rights of the respective users according to tables registered in the data machine that stores data generated by the different machine.

3. A data machine, comprising:
   an electronic message transmission/reception unit receiving a first electronic message including a request for data accesses, transmitting a second electronic message including results of the data accesses, and using standardized formats for the first and second electronic messages;
   a data storage unit dedicated to storing data corresponding to one transaction process or a limited number of transaction processes; and
   an access right control unit controlling an access right of a user based on a type of the access right of the user, the type of access right being defined according to each item of data stored in the data storage unit,
   wherein the data machine stores data generated by a different machine.

4. The data machine according to claim 3, wherein the data machine is connected to a processing machine that performs processes requested by a different machine, and
   wherein the data machine further comprises:
   a first table where the access rights of the respective users for accessing the processing machine that performs processes requested by the different machine are registered; and
   a second table where the access rights of respective users for accessing data items included in each file stored in the data machine are registered.

5. A man-machine interface machine connected to a processing machine and a data machine, comprising:
   an electronic message transmission/reception unit transmitting a first electronic message including a request for a transaction process, and receiving a second electronic message including results of the transaction process;
   an output unit performing operations dedicated to input/output of the transaction process, and outputting a type of an access right of a user, the type of access right being defined according to each of the transaction processes performed by the processing machine that executes the processes, or to each item of data stored in the data machine that stores data, wherein the data machine stores data generated by a different machine.

6. A processing method, comprising:

receiving a first electronic message including a request for a transaction process;

transmitting a second electronic message including results of the transaction process;

transmitting a third electronic message including a request for data accesses;

receiving a fourth electronic message including results of the data accesses by a processing machine transmitting the second and third electronic messages and receiving the first electronic message, where the first, second, third, and fourth electronic messages have standardized formats;

executing one dedicated transaction process or a limited number of dedicated transaction processes corresponding to the third and fourth electronic messages by a data machine that stores data generated by a different machine; and controlling an access right of a user based on a type of the access right of the user, the type of access right being defined according to each of the transaction processes or to each item of the data.

7. A processing machine, comprising:

electronic message transmission/reception means for receiving a first electronic message including a request for a transaction process, for transmitting a second electronic message including results of the transaction process, for transmitting a third electronic message including a request for data accesses, and receiving a fourth electronic message including results of the data accesses, wherein the first, second, third, and fourth electronic messages have respectively standardized formats;

dedicated transaction execution means for executing one dedicated transaction process or a limited number of dedicated transaction processes corresponding to the first and second electronic messages; and access right control means for controlling an access right of a user based on a type of the access right of the user, the type of access right being defined according to each of the transaction processes, wherein the processing machine is connected to a data machine that stores data generated by a different machine.

* * * * *